(12) United States Patent
Dal Molin et al.

(10) Patent No.: US 11,154,910 B2
(45) Date of Patent: Oct. 26, 2021

(54) LAUNDRY DRYER COMPRISING A FILTER ASSEMBLY AND A METHOD TO CLEAN A FILTER ASSEMBLY

(71) Applicant: Electrolux Appliances Aktiebolag, Stockholm (SE)

(72) Inventors: Rudy Dal Molin, Porcia PN (IT); Nicola Reid, Porcia PN (IT); Giuseppe Rossi, Porcia PN (IT); Michael Edenius, Porcia PN (IT); Gabriele Missio, Porcia PN (IT); Nadir Antonello Mazzarotto, Porcia PN (IT)

(73) Assignee: Electrolux Appliances Aktiebolag

( * ) Notice: Subject to any disclaimer, the term of this patent is extended or adjusted under 35 U.S.C. 154(b) by 81 days.

(21) Appl. No.: 16/473,720

(22) PCT Filed: Dec. 29, 2016

(86) PCT No.: PCT/EP2016/082882
§ 371 (c)(1),
(2) Date: Jun. 26, 2019

(87) PCT Pub. No.: WO2018/121867
PCT Pub. Date: Jul. 5, 2018

(65) Prior Publication Data
US 2019/0351459 A1 Nov. 21, 2019

(51) Int. Cl.
*D06F 58/22* (2006.01)
*B08B 1/00* (2006.01)
(Continued)

(52) U.S. Cl.
CPC .......... *B08B 1/005* (2013.01); *B01D 46/0065* (2013.01); *B01D 46/10* (2013.01); *D06F 58/22* (2013.01); *B01D 2279/55* (2013.01)

(58) Field of Classification Search
CPC .... B08B 1/005; B01D 46/0065; B01D 46/10; B01D 2279/55; D06F 58/22
(Continued)

(56) References Cited

U.S. PATENT DOCUMENTS 8,789,287 B2 * 7/2014 Kim .................. D06F 58/22
34/82
2006/0201014 A1 9/2006 Favret et al.
(Continued)

FOREIGN PATENT DOCUMENTS

| CN | 101363186 A | 2/2009 |
| CN | 103911799 A | 7/2014 |

(Continued)

OTHER PUBLICATIONS

Non Final Office Action for U.S. Appl. No. 16/473,344, dated Dec. 17, 2020, 14 pages.
(Continued)

*Primary Examiner* — John P McCormack
(74) *Attorney, Agent, or Firm* — RatnerPrestia

(57) ABSTRACT

A laundry dryer having a cabinet with a plinth, a first door on the plinth, a drum rotatable in the cabinet, a process air flow duct exiting the drum, and a filter assembly behind the first door in the a duct section inside the plinth. The filter assembly includes a frame, a filter supported by the frame, and a cleaning device. The cleaning device has a slidable wiper and a fluff collector. The cleaning device is movable within the frame to cause the wiper to wipe the filter, and to collect material wiped from the filter in the fluff collector.

24 Claims, 9 Drawing Sheets

(51) Int. Cl.
*B01D 46/00* (2006.01)
*B01D 46/10* (2006.01)

(58) Field of Classification Search
USPC .......................................................... 34/82
See application file for complete search history.

(56) References Cited

U.S. PATENT DOCUMENTS

| | | | |
|---|---|---|---|
| 2009/0038178 A1 | 2/2009 | Ahn et al. | |
| 2011/0225837 A1* | 9/2011 | Ahn | D06F 58/04 34/82 |
| 2011/0271542 A1 | 11/2011 | Ko et al. | |
| 2014/0109427 A1* | 4/2014 | Kim | D06F 58/22 34/85 |
| 2014/0182157 A1* | 7/2014 | Lee | F26B 21/003 34/82 |

FOREIGN PATENT DOCUMENTS

| | | | | |
|---|---|---|---|---|
| EP | 2055825 | A1 | 5/2009 | |
| EP | 2226421 | A1 * | 9/2010 | D06F 58/22 |
| EP | 2226421 | A1 | 9/2010 | |
| EP | 2749689 | A1 * | 7/2014 | D06F 58/22 |
| EP | 2749689 | A1 | 7/2014 | |
| JP | 0549795 | A | 3/1993 | |
| JP | 2008194439 | A | 8/2008 | |
| JP | 4245653 | B1 | 3/2009 | |
| JP | 2010022677 | A | 2/2010 | |
| WO | 2016095970 | A1 | 6/2016 | |

OTHER PUBLICATIONS

Chinese Office Action for Chinese Application No. 201680091874.X, dated Nov. 5, 2020 with translation, 18 pages.
International Search Report and Written Opinion for International Application No. PCT/EP2016/082882, dated Feb. 21, 2017, 10 pages.
International Search Report and Written Opinion for International Application No. PCT/EP2016/082888, dated Feb. 14, 2017, 9 pages.

* cited by examiner

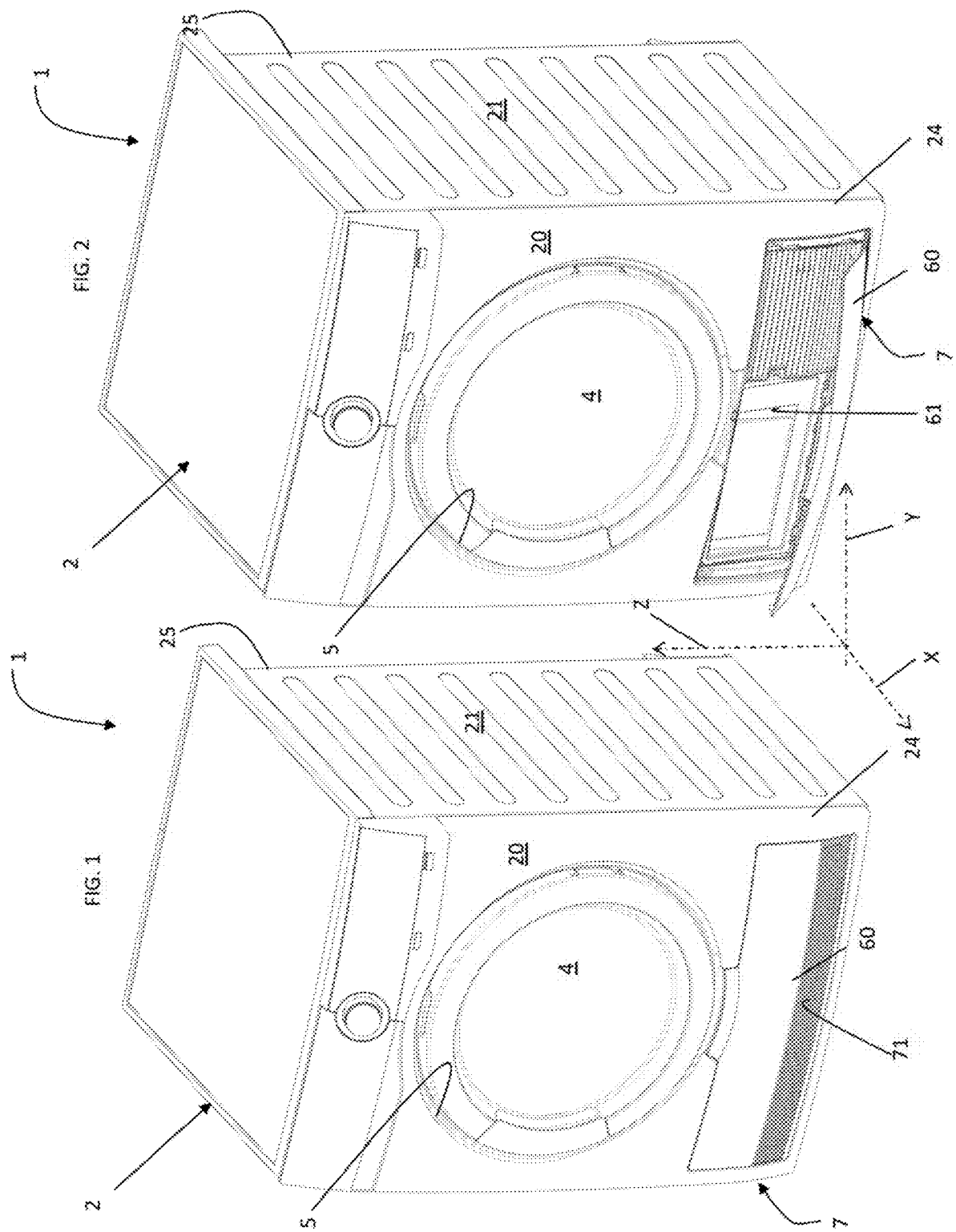

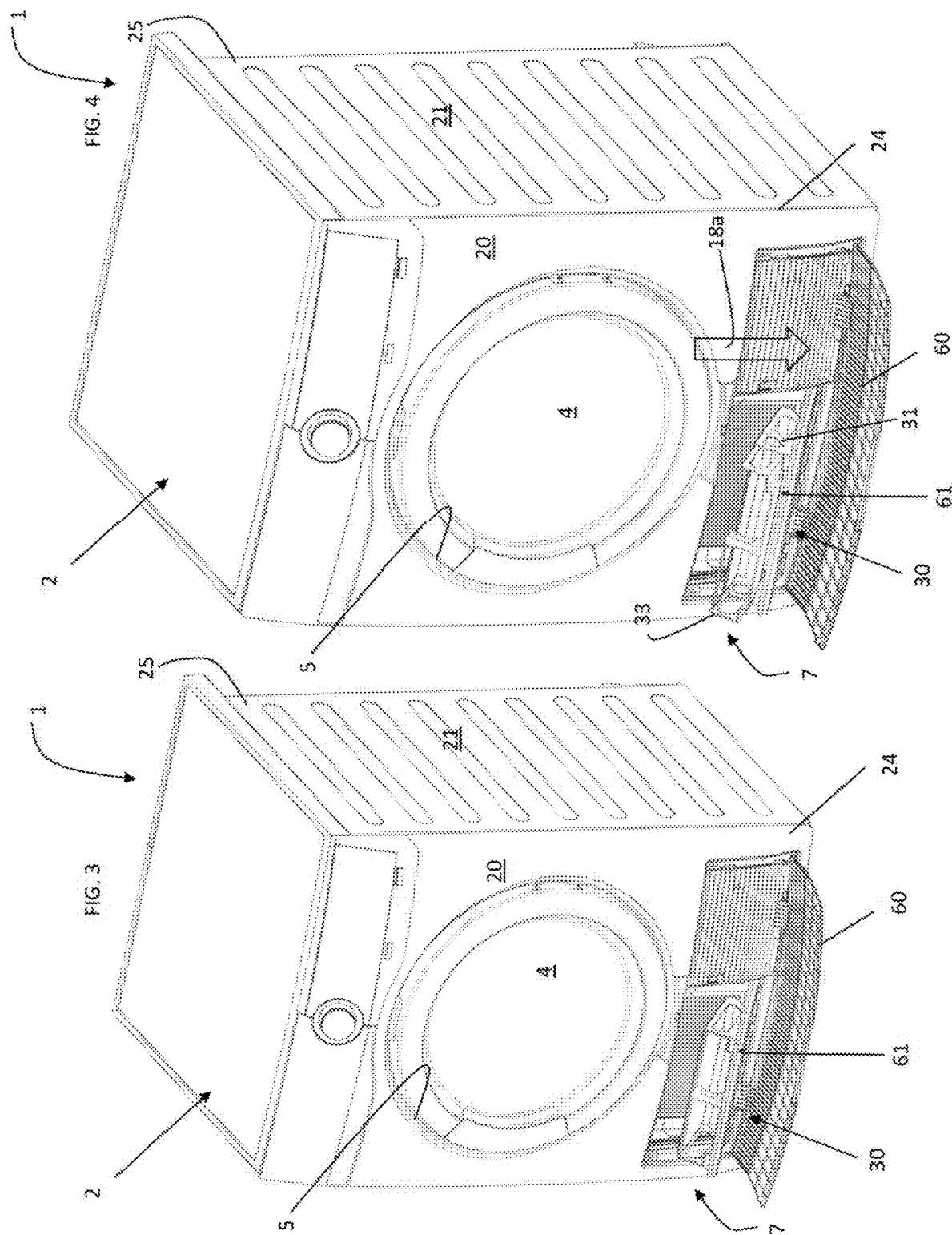

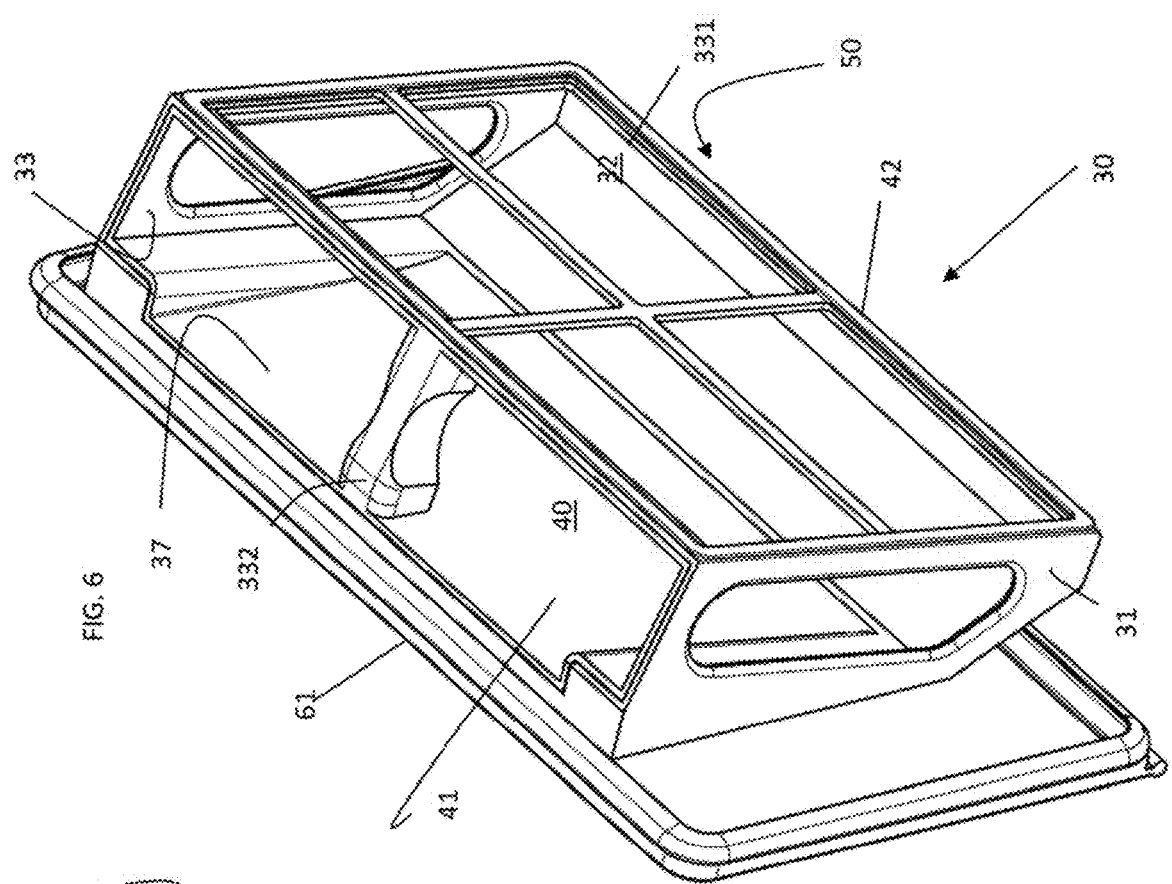
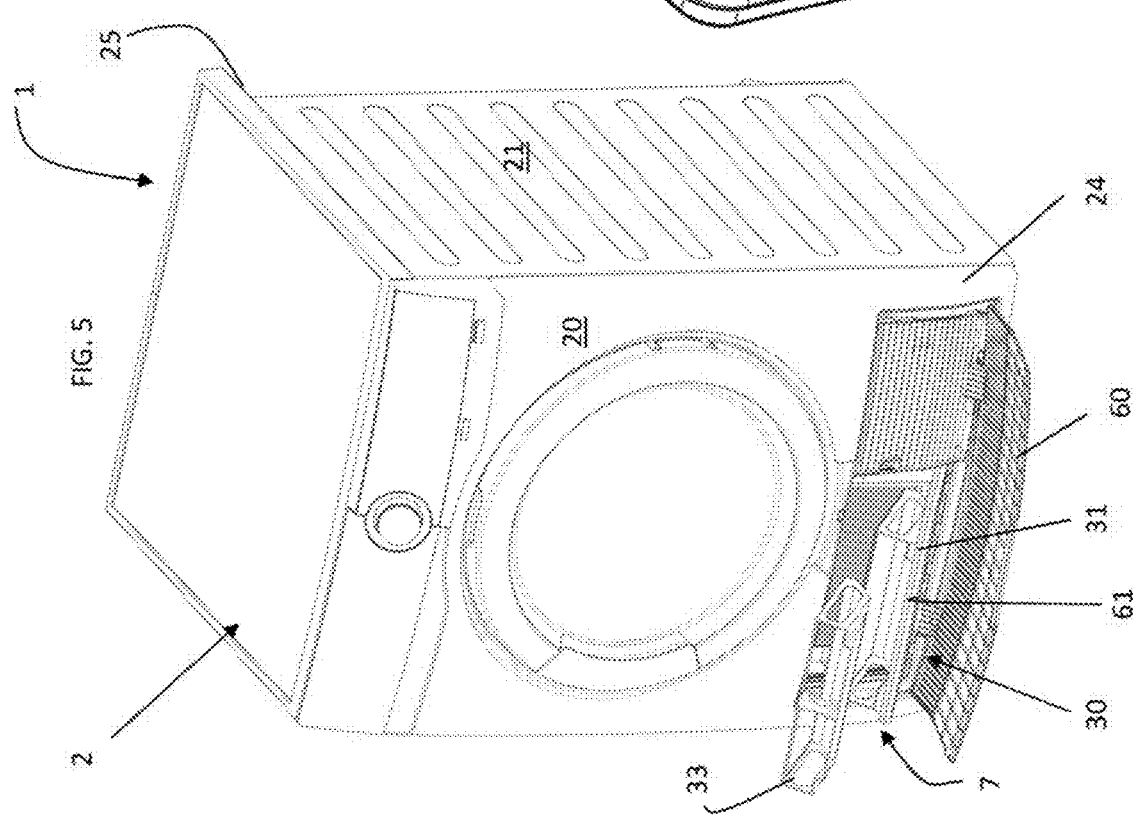

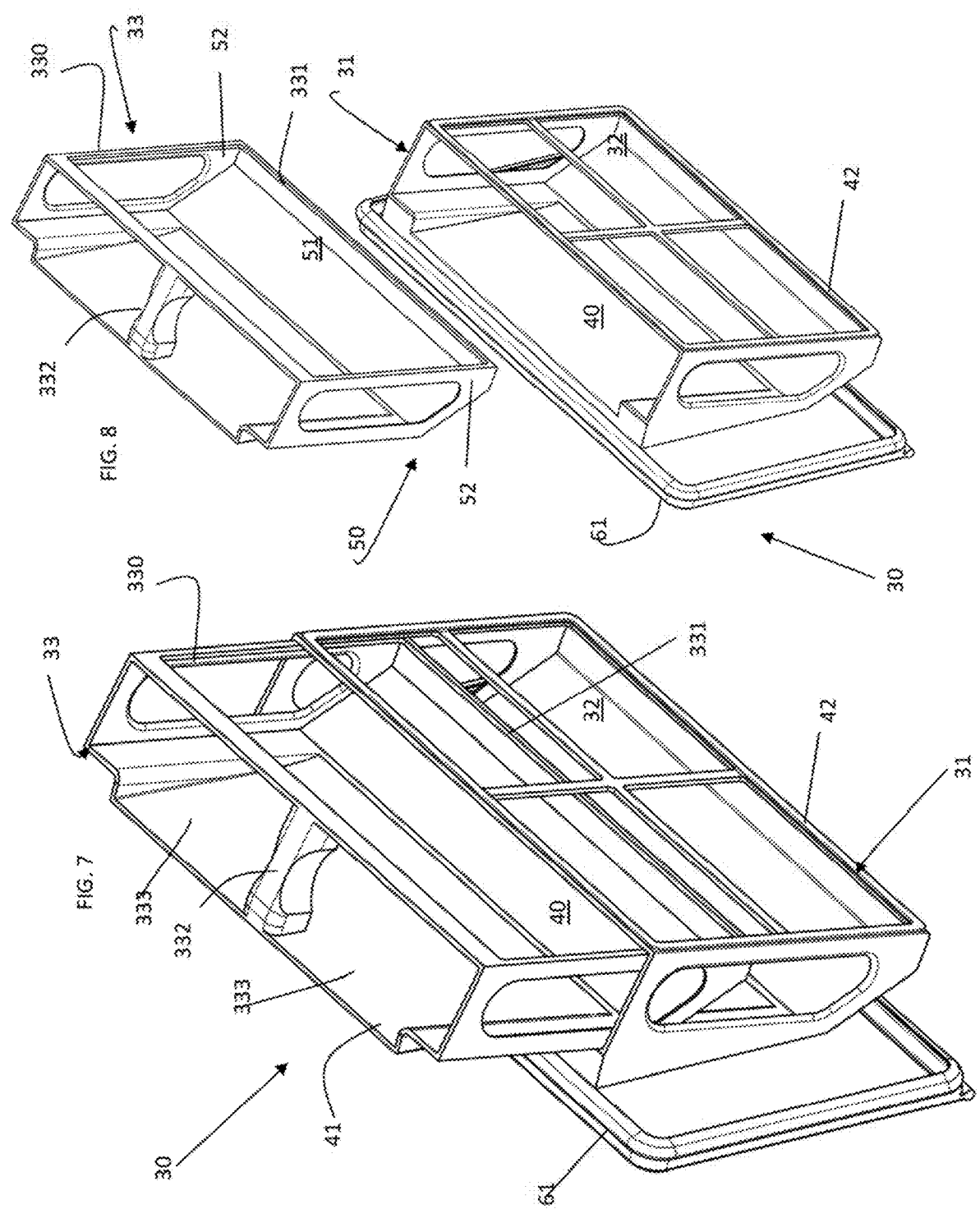

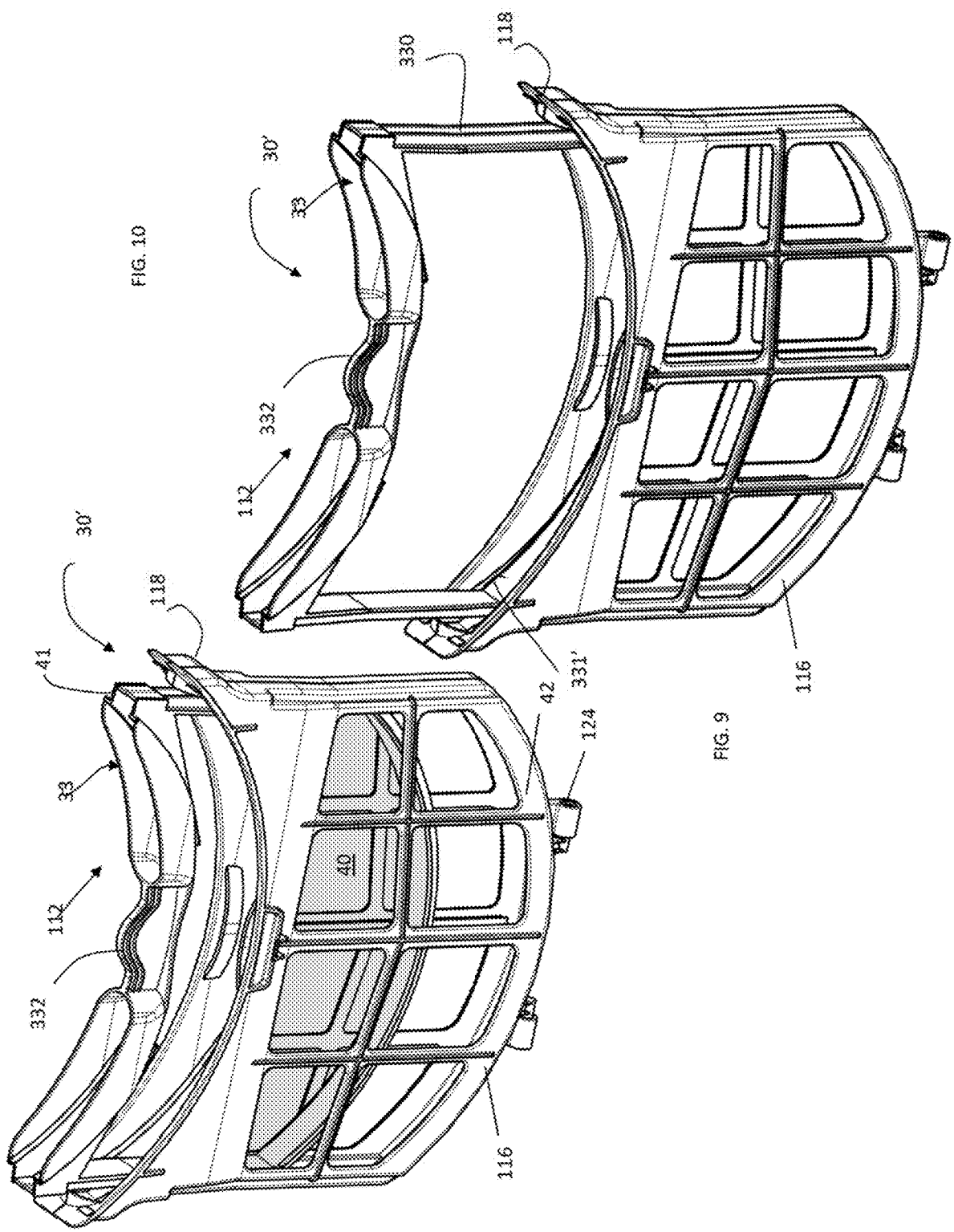

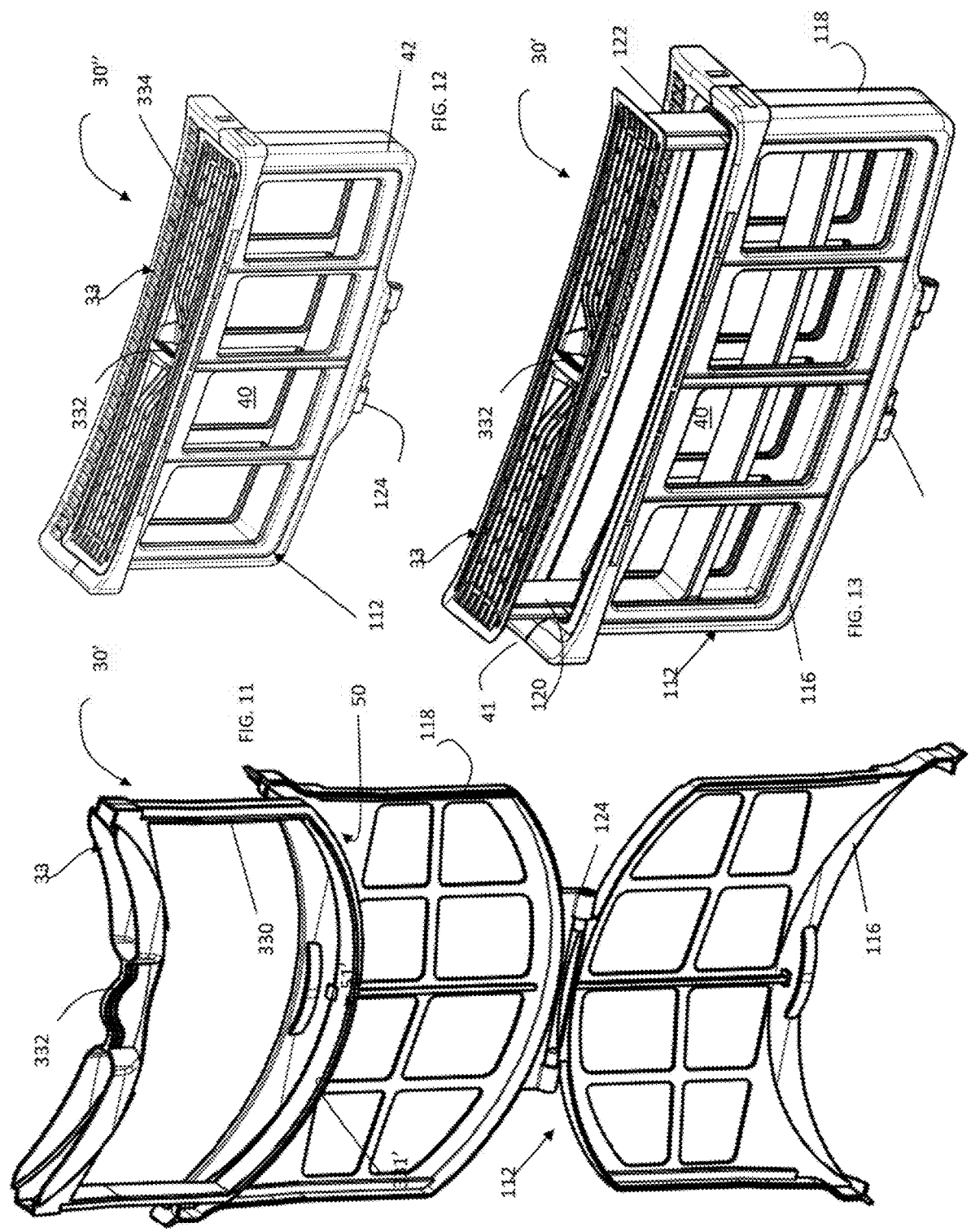

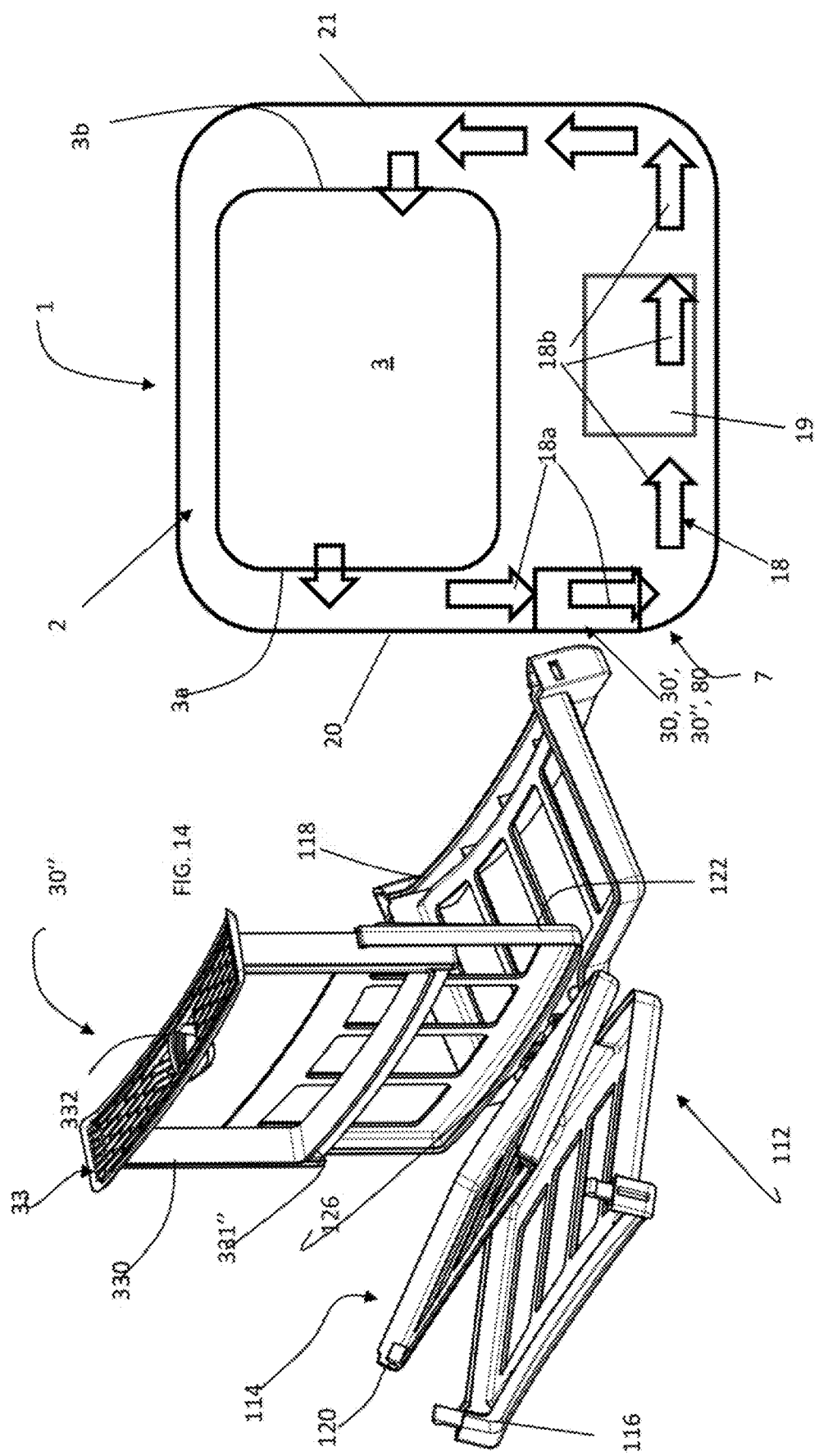

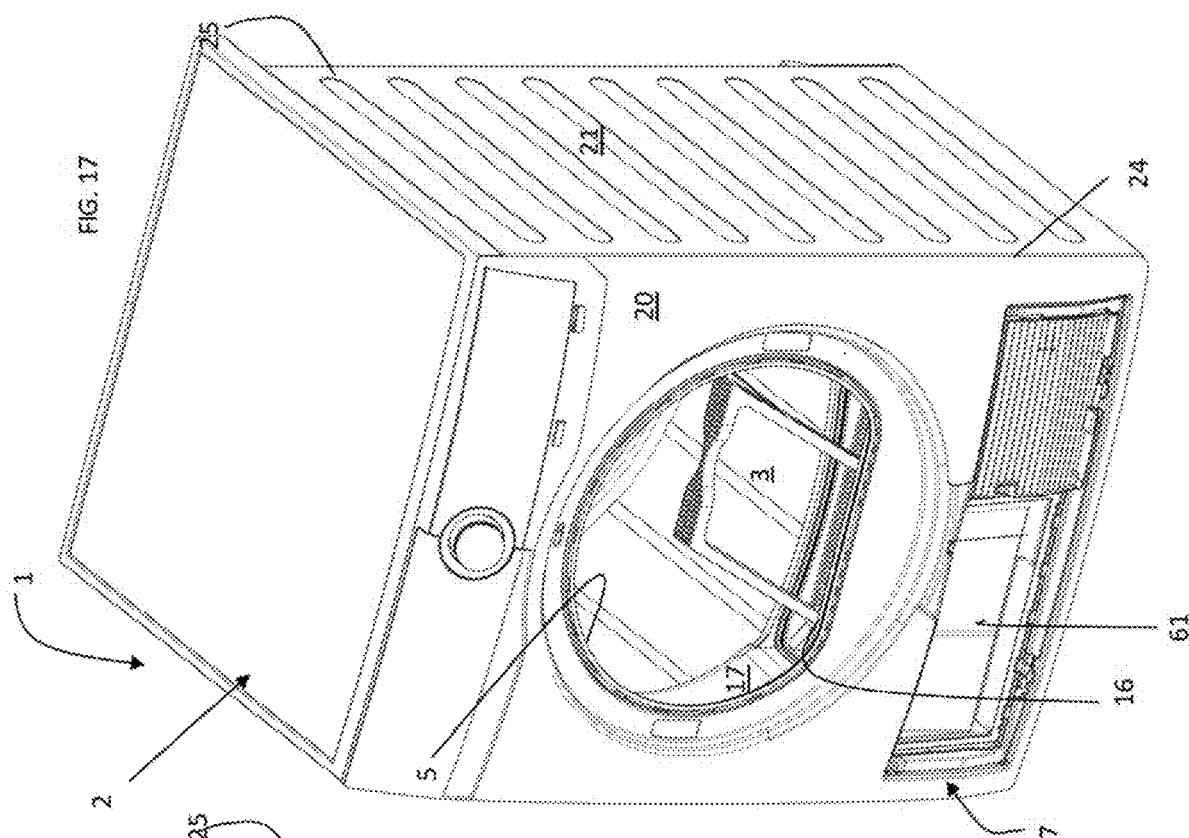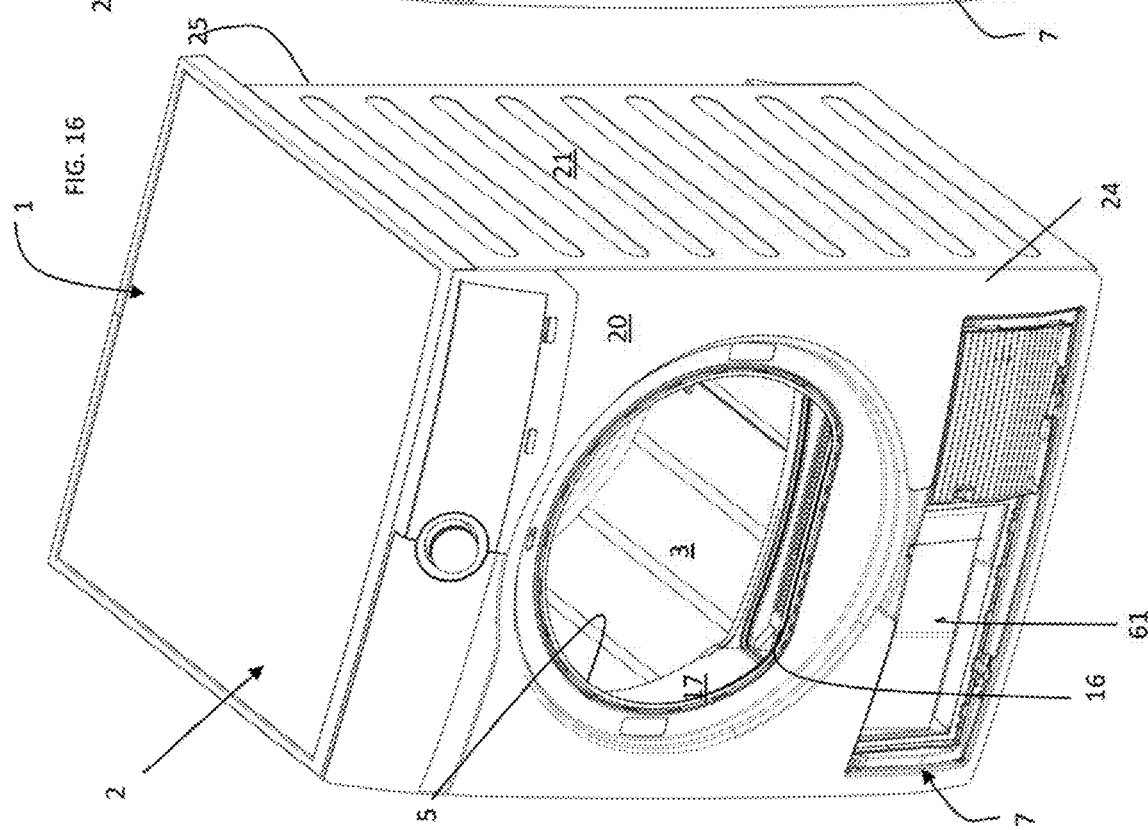

LAUNDRY DRYER COMPRISING A FILTER ASSEMBLY AND A METHOD TO CLEAN A FILTER ASSEMBLY

This application is a U.S. National Phase application of PCT International Application No. PCT/EP2016/082882, filed Dec. 29, 2016, which is incorporated by reference herein.

BACKGROUND

The present invention relates to a laundry dryer comprising a filter assembly having a cleaning device and to a method to clean such a filter assembly by means of the cleaning device.

Laundry dryers usually comprise filter systems for collecting fluff or lint which is detached from the laundry to be treated in the drying process. Typically, a prior art tumble dryer provides a filter system adjacent to a door (when the door is closed) of the tumble dryer to enable easy access to the filter system. An air flow is provided inside the tumble dryer that enters the filter system. Fluff or lint (in general foreign substances) that is carried by the air flow from the laundry to be dried is filtered out by the filter system, such that air that leaves the filter system is substantially free from lint or fluff. Said air can be heated up again and conveyed to the laundry treatment chamber of the tumble dryer or it can be vented outside.

If the accumulation of the foreign substance on the filter system becomes greater than a pre-set level, the foreign substance can interfere with the discharge of the air from the drum; thus, the filter system in the dryer should be cleaned periodically.

The way in which the operation of cleaning of the filter is performed depends on the type of filter system used. For example, some dryer includes below the loading/unloading door for the laundry a plinth having a plinth door to be opened in order to reach the filter system and clean the same using a suitable tool, leaving the filter system in place. Alternatively, the filter system cleaning is carried out as the user separates the filter system from the dryer after finishing a drying cycle, removes the foreign substance from the filter system, and again mounts the filter system into the dryer.

However, such filter cleaning carried out manually with an external tool or removing completely the filter system is not only cumbersome but also generally not liked by the user, who tries to postpone it. Due to this, because the filter cleaning may not be carried out every time the dryer is operated, until the filter is cleaned, a failure to secure adequate air flow rate required for drying due to the foreign substance interfering with the air flow being discharged from the drum can be obtained.

Further, in case the cleaning of the filter system requires an external tool, such as a brush, the latter can be lost or misplaced. In case the filter system needs to be removed from the laundry dryer in order to be cleaned, this may cause damages to the filter system itself in case of improper handling.

SUMMARY

The goal of the present invention is therefore to render available a laundry dryer including a filter assembly and a method to clean a filter assembly in a laundry dryer in which the cleaning operation of the filter assembly are simplified with respect to the prior art of record.

Preferably, the cleaning of the filter assembly does not require additional tool(s) external to the dryer which needs to be stored away and retrieved at the time of cleaning.

Further, the act of cleaning is preferably relatively easy and quick.

According to a first aspect, the invention relates to a laundry dryer comprising:
  a cabinet including a plinth portion defining an inner plinth volume internal to the cabinet;
  a first door arranged in the plinth portion of the cabinet;
  a drum rotatably supported in the cabinet;
  a duct defining a flow passage for process air exiting the drum;
  a filter assembly positioned at least partially in a duct section located in the inner plinth volume so as to filter process air flowing therein, said filter assembly being at least partly located behind the first door;
  said filter assembly including:
    a frame defining an inner frame volume and having a frame shape;
    a filter supported by the frame and defining a first filtering surface;
    a cleaning device positioned within said inner frame volume for cleaning the first filtering surface including a slidable wiper to wipe the first filtering surface;
    wherein said slidable wiper has a shape mating the frame shape of the inner frame volume so that it can be translated with respect to the frame so as to wipe the first filtering surface, said cleaning device further including a fluff collector apt to collect filtered material removed from the first filtering surface when the wiper is translated onto such first filtering surface.

According to second aspect, the invention relates to a method to clean a filter assembly in a laundry dryer, wherein the laundry dryer comprises:
  a cabinet including a plinth portion defining an inner plinth volume internal to the cabinet;
  a first door arranged in the plinth portion of the cabinet;
  a drum rotatably supported in the cabinet;
  a duct defining a flow passage for process air exiting the drum;
  a filter assembly positioned in a duct section located in the inner plinth volume so as to filter process air flowing therein, said filter assembly being at least partly located behind the first door;
  said filter assembly including:
    a frame defining an inner frame volume and having a frame shape;
    a filter supported by the frame and defining a first filtering surface;
    a cleaning device positioned within said inner frame volume for cleaning the first filtering surface including a wiper having a shape mating the frame shape of the inner frame volume;
  the method including:
  opening said first door in order to access said wiper;
  sliding said wiper so as to wipe the first filtering surface;
  collecting, while sliding, filtered material present in said first filtering surface in a fluff collector of said wiper.

In the following, when relative terms such as "front", "back", "rear", "lateral", "top", "bottom", etc. are used, they refer to the normal operational position of the laundry dryer when in use, e.g. located on a floor which usually is (substantially) horizontal. Thus, a horizontal plane is a plane perpendicular to the floor where the dryer is located. The location of a loading/unloading door of the laundry dryer, usually used to load and unload laundry from the dryer and generally coupled to a front wall of the cabinet in order to access the drum, defines the "front" of the dryer itself. Given the horizontal plane on which the laundry is located, "top" and "bottom"—as their normal common meaning—refer to the position of an object along a vertical axis. The vertical axis is defined as an axis parallel to the horizontal plane, such as the floor.

With the terms "laundry dryer" or "dryer" both an appliance having drying functions only, or a combined washer-dryer appliance, which is capable of performing both washing and drying cycles, are meant.

The dryer includes a cabinet or bearing structure, comprising preferably a basement, a front wall and a rear wall. The front and rear wall are preferably mounted on the basement, which is standing on a surface, such as the floor. The front wall may advantageously be provided with a through opening, at which a door is mounted to access the interior of the cabinet in order to locate or remove the laundry. Lateral walls connect the front and the rear wall to form, together with a top wall, a closed volume.

The basement rests on a floor and its vertical distance from the floor may be advantageously adjusted through regulating feet provided on the lower surface of the basement facing the floor.

The basement defines in turn a plinth region of the dryer. The plinth has a plinth inner volume, that is, the volume inside the cabinet delimited by the cabinet walls and located at the plinth region. The plinth may be perforated, or including a perforated element, so as to enable cooling air to be taken in and expelled, if needed. The plinth can be provided with portions for supporting operational components of the laundry dryer that are needed for carrying on a laundry drying process on laundry, such as air conduits, motors and so on. In the plinth, generally most of the components of the dryer are located, such as the heat exchangers, due to the available space.

The laundry dryer of the invention includes a drum, in which the load, e.g. clothes or other laundry, to be dried is placed. The drum further preferably includes a mantle defining a front end and a rear end, the front end facing the front wall of the cabinet, and preferably the opening therein realized and closed by the door for loading and unloading the laundry, and a rear end facing the rear wall of the cabinet.

The drum of the dryer of the invention may be closed drum, i.e. the rear end is closed by a back wall or a flange, which rotates as a single piece together with the mantle when the drum is driven into rotation. Alternatively, it can be an open drum, where the closure of the rear end of the drum is given by a back wall which is stationary, that is, it does not rotate with the drum and it is preferably integral to the cabinet. Thus, the back wall of the drum can be either attached to the drum and rotate with the same, or attached to the cabinet and be still.

Within the cabinet, the drum is rotatably mounted for rotating, preferably according to a substantially horizontal or tilted rotation axis. For example, at least one drum support assembly for rotatably supporting the drum in its rotation around this given rotation axis is provided for within the cabinet.

The drum is fluidly connected to a duct defining a flow passage for process air exiting the drum. Indeed, relatively dry and warm process air flows on the laundry located in the drum so as to dry the same. The then humid cooler process air needs to be removed from the drum so that, for example, additional dry air can flow in.

The drum is part of a process air circuit, in particular a closed-loop circuit in case of a condensed dryer or an open circuit in case of a vented dryer, which in both cases includes a process air duct for channelling a stream of process air to dry the load. The process air duct may be connected with its two opposite ends to the drum. In this embodiment, hot dry air is fed into the drum, flowing over the laundry, and the resulting humid (and to a lower temperature cooled down) air exits the same. In case of a closed-loop drying air circuit, the humid air stream, rich in water vapour, is then fed into a humidity removal element and/or a hot air generator, such as a heat exchanger. The resulting cool dry air is then heated up before re-entering again in the drying chamber by means of a hot drying air generator, which can be for example a condenser of the heat pump system or an air/air exchanger, and the whole loop is repeated till the end of the drying cycle. Furthermore, the hot drying air generator may comprise an electrical or gas powered heating device. In a vented dryer, ambient air is taken into the dryer via an inlet duct, such air is heated up by a hot drying air generator, such as condenser of a heat pump system and/or an electrical or gas powered heating device, before entering the drum. Heated air flowing through and on humid laundry contained in the drum, removes humidity from laundry. Humid air stream exiting the drum may be optionally dehumidified by an evaporator of a heat pump system, or an air-air type heat exchanger as explained above, before being exhausted outside the dryer.

Preferably, the hot or drying air generator is located in a basement of the cabinet.

In an embodiment, the duct is guiding the process air from the drum. A section of the duct, preferably a front duct section, guides the process air coming out of the drum downwards towards the basement of the laundry dryer and deflects the process air flow from the downward direction to a horizontal direction. 'Downward' direction may include flow path sections that are vertical and/or (partially) inclined to the vertical or even partially horizontal—however with the net effect that in the channel section unit the process air is guided downward from a higher to a lower altitude level (in the normal operation orientation of the laundry treatment apparatus). Preferably the process air deflected to the horizontal flow direction is either vented to the outside or enters into the hot or drying air generator. In this latter case, then the process air then re-enters the drum, via for example a rear wall of the same, which can be perforated.

Further, preferably, the process air duct may include a fan to blow the process air flowing into the process air duct.

The process air duct is also provided with a filter assembly, which is arranged along the duct, before the vent in case of a vented dryer, so that fluff is not disposed to the outside, or upstream the hot or drying generator, in case of a condensed dryer, to prevent the fluff and/or lint particles from reaching and clogging up the generator and/or the fan. The filter assembly is located within a duct section, that is in a portion of the duct, so that the process air flowing in the process air duct is filtered by the filter assembly.

The filter assembly is positioned in the duct portion within the cabinet in correspondence of the plinth, that is, within the inner plinth volume.

The filter assembly includes a frame supporting a first filtering surface. Any filter assembly shape can be used in the present invention as long as it includes a filtering surface at to filter the process air flowing in the duct. In the same way, the first filtering surface may have any shape, it may for example include a mesh or net having a proper size to block the typical fluff or particles generated by the laundry. As an example, the filter assembly may include a flat first filtering surface having a square shape. The filtering surface may be substantially vertical. Alternatively, the filtering surface may be tilted with respect to a vertical plane, or more than a filtering surface may be present. Further, the frame defines an inner frame volume. For example, the frame may have a box-like shape the walls of which surround an inner volume. The walls may be open or closed.

Further, the frame of the filter assembly includes a cleaning device apt to clean the first filtering surface, where, as mentioned, fluff, particles, dust and other material may be present, filtered from the process air leaving the drum and entering the duct. This material is filtered by the first filtering surface of the filter assembly, which is preferably properly dimensioned and positioned into the duct so that substantially the whole dimension in cross section of the duct is covered by the filtering surface. In this way, most of the foreign material present in the process air is removed by the first filtering surface.

Due to the filtering action, the first filtering surface becomes with time covered by the filtered material which has been removed from the process air flowing in the duct. In order to maintain efficiency of the dryer, the collected material on the filtering surface needs to be periodically removed.

The means to remove such material from the first filtering surface include in the present invention the cleaning device, which comprises a wiper adapted to be moved onto the first filtering surface. Due to the wiper's movement, and the resulting abrasion onto the first filtering surface, fluff, lint and other filtered material is detached from the filtering surface.

The movement of the wiper with respect to the first filtering surface creates the wiping action. The movements of the wiper with respect of the first filtering surface in the invention are sliding movements. The wiper slides on the first filtering surface and while sliding the filtering surface the filtered material on it is removed. During the movement, the wiper wipes the first filtering surface and drag in their movement the filtered material present on it. After the wiping action, the filtering surface is substantially filtered material-free.

Preferably, the wiping action is performed at the end of every drying cycle of the appliance. Leaving the fluff and lint on the filtering surface significantly decreases the performances of the appliance itself and therefore a constant cleaning of the filtering surface by wiper's movements is advised.

The shape of the wiper is matching the shape of the frame. That is, the inner volume defined by the frame has a shape matched by the wiper. In this way, the sliding of the wiper becomes easy and reproducible. Having a mating shape allows a sliding of the wiper without—or with only minimal—risks of misplacement of the wiper. The sliding becomes easy and the user does not have to perform any difficult manoeuvre to move the wiper, being the sliding motion substantially the only motion possible by the wiper, being confined in the inner volume defined by the frame. Wrong movements of the wiper with respect to the first filtering surface are thus substantially not possible, and the cleaning action of the filter assembly is simplified.

The filter assembly further includes a fluff collector to collect the filtered material which is removed from the first filtering surface. The fluff collector is part of the wiper so that, when the filtered material is removed from the filtering surface, it is directly introduced into the fluff collector.

The fluff collector may include a bottom part of the wiper. The wiper could be for example box-like shaped and the fluff collector may be the bottom part of the box. Preferably, the fluff collector is located at the bottom of the wiper, so that the fluff and lint falls into the fluff collector by gravity.

In order to operate the wiper and clean the first filtering surface and/or in order to access the fluff collector and to empty it when it is full or for any other maintenance purposes, a first door is provided in the cabinet of the dryer. This door, preferably located at the plinth due to the fact that at the plinth the filter assembly, e.g. the wiper and the fluff collector, is positioned, may be a plinth door or any other door that gives access to the inner volume of the plinth. The first door may for example be hinged at the cabinet.

Due to the construction of the filter assembly and its positioning in the plinth inner volume, accessible by a first door, the wiping action is simplified and filtered material collected in the fluff collector easily removed.

Preferably, said first door is a plinth door giving access to the plinth portion of the cabinet or a door accessible by opening said plinth door.

The plinth of the dryer advantageously comprises an operable plinth door, typically hinged at one side to the remaining of the cabinet, for enabling the access to the inner region of the cabinet and, in particular, to the heat exchanger, if present, or in order to empty the condense water collection tank, for cleaning the condensing system or generally for maintenance purposes.

The first door may be the plinth door or another door located for example beind the plinth door.

Preferably, said first door is a rotatable door. More preferably, said rotatable door is hinged to a front wall of said cabinet defining a rotatable axis, said rotatable axis being substantially horizontal.

An horizontal axis of the door simplifies access to the plinth inner volume in particular when the dryer is located in small rooms where an opening of a long door around a vertical axis may be not possible or inconvenient.

Preferably, said filter assembly is attached to said first door.

In order to simplify accessibility of the filter assembly by the user, the filter assembly is attached to the first door, so that, when the first door is open, the filter assembly is moved from the plinth inner volume and it is easier to access it by the user. Wiping of the first filtering surface, or removal of the filtered material becomes easier, the user not being forced to bend or position him/herself in an awkward position.

Preferably, said filter assembly is located for its entirety in said inner plinth volume.

Preferably, said filter assembly is rotatably mounted, so that it can rotate around a filter assembly axis.

In order to facilitate the wiper actuation and the removal of filtered material, the filter assembly is preferably movable from its first position within the plinth inner volume, position which is taken in order to proper filtering the process air flowing in the duct. In order to change this position, which is difficult to reach by a user, preferably, the filter assembly is rotatable around an axis, for example an horizontal axis. The rotation around such an axis allows the filter assembly to reach a second position where it is easier to reach and actuate the wiper to slide the same and perform a wiping action. Further, the fact that the wiper needs to slide to clean the first filtering surface means that—when actuated—a space to manoeuvre or a free volume is needed for the wiper movement. Indeed, during the wiping movement, the wiper may move from a position in which it is completely contained in the frame to a position in which protrudes outside the frame. A rotation of the assembly in a second position, so that it is moved to a location at least partially outside the plinth inner volume or where it is oriented so that it faces the outside of the cabinet where this additional space or volume is available, is thus welcomed.

Further, it may be needed to remove the wiper from the frame in order to remove from the fluff collector the collected filtered material. In order to perform the removal operation, in the second position of the filter assembly, enough free volume for the extraction is preferably available.

This rotation may take place because the filter assembly is attached to the first door, thus rotation of the first door around its rotational axis implies rotation of the filter assembly, or also independently. In this second case, in order to access the filter assembly and wipe the first filtering surface, the first door needs to be opened and then the filter assembly needs to be rotated in order to reach its second—more accessible—position. The wiper then may be extracted from the frame. The reverse operation is performed in order to bring the dryer back in a configuration where a new drying cycle may be initiated. The reverse operation includes inserting the wiper back into the frame, rotating back the filter assembly in its first position within the plinth inner volume and close the first door. Due to the fact that the filter assembly needs to be rotated back in the original first position before closing the first door, it helps the user to remember to re-insert the wiper in the frame after the removal of the filtered material therein collected before closing the first door.

More preferably, said filter assembly axis is substantially horizontal. Even more preferably, said axis is parallel to a rotatable axis of said first door.

When the first door is opened, preferably the filter assembly is moved to the second position where the wiper is visible to the user, becoming immediately accessible. The horizontal rotation thus preferably turns the filter assembly towards the exterior of the cabinet, e.g. towards the user. This rotation can be caused by the rotation of the first door around its rotational axis or by the independent rotation of the filter assembly.

Preferably, said filter assembly axis and said rotatable axis are coincident.

Preferably, said filter assembly comprises the first filtering surface and a non-filtering surface facing the first filtering surface. More preferably, said non-filtering surface is attached to said first door.

The filter assembly can be attached to the first door, used for example to access a portion of the dryer different from the drum (i.e. the plinth). By opening the first door, the filter assembly can be for example rotated, so that the wiper can be removed or the wiper actuated in order to wipe the filtering surface. In case the filtering surface is attached to the first door, there is no need to have a filtering surface on the side attached to the door, because anyhow the passage of process air from that surface would not be possible, so preferably a non-filtering surface is present. Preferably the non-filtering surface is opposite or faces the filtering surface. Preferably, the filtering surface and the non-filtering surface are two opposite sides of the frame. Preferably, filtering surface and non-filtering surface are substantially vertical.

Preferably, said filter assembly defines a portion of said duct section for said process air. More preferably, said non-filtering surface is a portion of a delimiting wall of said duct section.

The filter assembly in the plinth region can be part of the duct itself. For example, the non-filtering surface may be a wall, or part of a wall, of the duct. The filter assembly is then used to guide and eventually bend the flow of process air flowing into the duct.

Preferably, said fluff collector is fixed to said slidable wiper. More preferably, it is integrally formed with the slidable wiper. In this way, movements of the wiper correspond to movements of the fluff collector and the filtered material removed from the first filtering surface is immediately gathered into the fluff collector without being dispersed in the plinth inner volume.

Preferably, said frame is box-like shaped and said slidable wiper has a mating box-like shape.

The frame and the wiper are thus two boxes one inside the other. The boxes could be for example parallelepiped but any shape is possible. The filtering surface is thus preferably including or positioned at one side of the box. The wiper is thus a box including a bar or any other element that scratches against the first filtering surface while the wiper-box is sliding within the frame box.

More preferably, said fluff collector includes a bottom and/or a side part of said mating box-like shape.

Preferably, the frame defines a top and a bottom and the first filtering surface is substantially vertically oriented. In the same way, the wiper includes a top and a bottom, positioned, when inserted into the frame, so that they corresponds to top and bottom of the frame. Thus, preferably, the fluff collector includes a bottom portion and/or a side portion of the wiper so that the filtered material such as fluff and lint can fall into the fluff collector by gravity while it is removed by the wiper from the first filtering surface.

Preferably, said fluff collector is located between said first filtering surface and said first door.

The fluff collector is positioned between the first filtering surface and the first door. Preferably first filtering surface and first door are facing each other.

Preferably, said fluff collector includes a portion substantially perpendicular to said first filtering surface, when said slidable wiper is inserted in said frame.

For example, in a box-like shape, the filtering surface corresponds to a side of the frame box and the fluff collector to a bottom side of the wiper matching the bottom side of the frame when the wiper is totally inserted into the frame.

Preferably, said fluff collector includes a portion substantially perpendicular to said first door, when said wiper is inserted in said frame.

For example, in a box-like shape, the first door is attached to a side of the frame box and the fluff collector to a bottom side of the wiper matching the bottom side of the frame.

Preferably, said fluff collector is integral to said slidable wiper.

For example, fluff collector and wiper can be formed by injection molding in the same process step.

Preferably, said wiper includes one or more ribs or an edge to scrape said first filtering surface. More preferably, said rib or edge is part of said fluff collector.

The wiper has a portion which scratches the first filtering surface. This portion can be any element of the box-like shape forming the wiper which is in contact with the first filtering surface when the wiper slides in the frame. The wiping part of the wiper can be a rib, such as a bar, or any edge—such as of a connecting element—that can perform this scraping action.

Preferably, said slidable wiper includes a manually operated handle to pull the wiper slidably out of the frame. More preferably, said manually operated handle can be handled opening said first door. Even more preferably, said manually operated handle is integral to said slidable wiper.

In order to easily actuate the wiper to perform the sliding movement and clean the first filtering surface, a manually operable handle is provided, preferably integral to the rest of the wiper. For example, the handle can be an upper portion of the box-like shape defining the wiper. Handle and the rest of the wiper may be fabricated in the same moulding step. Preferably handle and wiper are realized in plastic material.

Preferably, the manually operable handle is located in an upper portion of the wiper.

Preferably, the upper portion of the wiper is air permeable. Preferably, the upper portion is located at an inlet of the filter assembly for the process air. Even more preferably, said wiper upper is air-permeable in a given direction.

In order not to disturb the flow of process air, preferably the upper portion of the wiper, where the process air enters the filter assembly, is air permeable, so that the flow of process air flowing through the duct can pass the wiper upper portion without being blocked by it.

Even more preferably, said wiper upper portion includes any of:
a wall with perforations;
a plurality of ribs;
a first and a second crosspiece.

In order to realize an upper portion which is air permeable, several possibilities arise. For example, the upper portion of the wiper may include a surface having perforations, or it may include ribs or crosspieces connecting two opposite sides of the upper portion of the wiper.

Preferably, the wiper upper portion is air permeable in the direction perpendicular to the direction of the main flow of the process air. For example, the wiper may be air permeable in a direction substantially perpendicular to a plane including the first filtering surface.

Preferably, said slidable wiper is movable in a wiping action between a resting position wherein said fluff collector is located at a bottom of said frame, to an end position, wherein said fluff collector is located at an upper part of said frame.

In an embodiment in which the filter is substantially vertically oriented, that is, in an embodiment where the first filtering surface is substantially vertical, the two positions of the wiper are preferably as follows. In the resting position, position which is held normally during the functioning of the dryer while the filter assembly is filtering process air in the process air duct, the wiper is positioned so that the fluff collector is at the bottom of the frame. In this way, the fluff collector does not hinder the passage of air in the duct and additionally the filter assembly occupies the minimum volume, being the wiper inserted as much as possible inside the frame. In the end position, which represents the end of a wiping action, the fluff collector is located at an upper part of the frame, so that the filtered material can be easily removed and the fluff collector emptied.

Preferably, said slidable wiper is movable between a resting position where it is inserted into said frame, to an end position, wherein it extracted from said frame for the majority thereof. More preferably, said fluff collector, in said end position, is still located within said frame.

The wiper therefore moves from the resting position where the filter assembly is substantially "compact" so an end position in which the wiper extends from the frame and it is substantially a geometrical continuation thereof, the fluff collector moving from one end to the other of the frame, preferably from the bottom to the top of the same.

Preferably, said first filtering surface extends between a bottom and an upper part of said frame.

Even more preferably, said first filtering surface is substantially vertical.

Preferably, said cabinet includes a loading/unloading aperture to allow access to the drum and a door to close said aperture, and said first door is located below said loading/unloading door.

Dryers commonly includes a loading/unloading aperture closed by a door which is used to load and unload the dryer. This door is generally located above the plinth.

Preferably, the dryer includes:
an actuator, adapted to force said wiper to perform said sliding movement with respect to said frame when actuated, said actuator being located remote from said filter assembly;
a connector, to connect the actuator and the wiper, so that movements of the actuator are transformed in sliding movement of the wiper.

Accessing the plinth of the appliance every time a wiping action is needed, in order to actuate the wiper and move the same on the filtering surface may be undesired, due generally to the not very comfortable position to be taken by the user (e.g. bending) in order to do so. Therefore, according to an aspect of the invention, the filter assembly may include an actuator, which is connected to the wiper in order to force it to perform the wiping movement. In other words, actuating the actuator, e.g. moving the actuator, a corresponding movement of the wiper is obtained.

The movement of the actuator may be different from the movement of the wiper. That is to say, if the wiping movement is for example a translation, in order to obtain this movement, the actuator need not to be translated as well. A rotation could be envisaged, or a roto-translation, as long as this actuator movement is then "transformed" so that the correct sliding movement of the wiper is achieved.

The actuator can be located in a different position of the cabinet with respect to the wiper. For example, it can be positioned in a location which is easily accessible by the user.

In order to ensure that movements of the actuator leads to movements of the wiper, the filter assembly further includes a connector. The connector can be any link between the wiper and the actuator that sends the command from the actuator to the wiper to move the latter.

The connector performs the "transformation" of the actuator movements into the wiper movements.

Preferably, said actuator is adapted to perform a translation.

More preferably, the actuator is pulled up and while pulled up it drags the wiper in the same translating or sliding movement.

Preferably, said cabinet includes a loading/unloading aperture to allow access to the drum and a loading/unloading door to close said loading/unloading aperture, an inlet of said duct being formed on a rim surface of said loading/unloading aperture, and wherein said actuator is located at said inlet.

The dryer further includes in the cabinet a loading/unloading door. Opening the loading/unloading door renders the actuator accessible. Preferably, the corresponding location of the actuator is optimized for a proper handling of the actuator. The loading/unloading door is commonly opened by the user to load or unload the laundry and therefore there is no need of further operation—besides the wiping—to be performed by the user in order to clean the filer assembly.

In this way, the wiper can be moved by means of the actuator, via the connector, at the end of every drying cycle, if needed, by opening the loading/unloading door and handling the actuator. In this way the frequent wiping action is performed in a comfortable position for the user. At the same time, the filtered material collected in the fluff collector can also be removed, simply extracting the wiper from the frame, still pulling further the actuator, so that the fluff collector is accessible.

Preferably, said connector is realized in plastic and/or metal.

Preferably, the connector includes two bars extending two lateral sides of the wiper.

Preferably, the connector substantially prolongs the wiper, e.g. it is a geometrical continuation of the same, so that the wiper can be translated, e.g. can be slided over the first filtering surface, pulling the actuator. The connector thus makes the wiper "longer" at least in one direction, so that it can be slided from "far", that is, the inner volume of the plinth where the wiper is located does not need to be accessed by the user. Preferably, the lateral sides of the wiper correspond to sides of the wiper substantially perpendicular to the first filtering surface and/or perpendicular to the first door.

Preferably, the actuator includes a manually operable handle portion.

Preferably, the actuator is better operated by means of an handle.

Preferably, the method includes:
removing said wiper from said frame in order to dispose said filtered material.

In order to remove the filtered material, being the fluff collector part of the wiper, it is possible to remove the wiper from the frame and empty the fluff container present therein. This operation is preferably a continuation of the sliding action performed for wiping, that is, the wiper can be removed from the frame simply continuing the sliding action further.

Preferably, said step of sliding said wiper includes:
pulling up said wiper from a first position where it is fully inserted in said inner volume of said frame, to a second position wherein it is at least partially protruding from said frame.

In normal operation of the dryer, the wiper is preferably completely contained in the frame so as to minimize the volume occupied by the filter assembly. This position of the wiper is called resting position. At the end of the wiping movement or wiping action, the wiper protrudes from the frame. This is called end position of the wiper. The same takes place when the wiper is connected to an actuator, that is, by moving the actuator, the wiper is moved from the resting to the end position, and vice-versa.

Preferably, the method includes, after collecting said filtered material:
pushing downwards said wiper so as to insert it back in said inner volume.

In order to be able to restart standard operation of the dryer, the wiper needs to be put back in the original position where it is inserted in the inner volume defined by the frame.

Preferably, said step of sliding said wiper includes:
sliding said wiper pulling or pushing a manually operable handle.

In order to easily actuate the wiper, a manually operable handle is present which can be pushed or pulled in order to slide the whole wiper onto the first filtering surface.

Preferably, the step of opening said first door includes the step of:
rotating said first door around a horizontal axis.

The first door is preferably rotatable so that it is openable substantially with an horizontal rotational axis.

Preferably, the method includes, after or during said step of opening said first door:
rotating said filter assembly around a given axis.

The filter assembly may be attached to the first door, so that rotations of the first door correspond to rotation of the filter assembly, or detached from the same. In the latter case, the filter assembly may also be rotatable, independently rotatable, in order to orient itself in a position easily accessible by the user so that the user may easily actuate the wiper.

More preferably, the method includes, after rotating said filter assembly:
sliding said wiper so as to extract said wiper from said frame.

When the filter assembly is rotated, is preferably not any more completely contained in the plinth inner volume or it is at least oriented towards the exterior of the cabinet, regardless whether it rotates with the first door or independently. Being at least partially outside the plinth inner volume or oriented outwards, the filter assembly is easily accessible in order to perform the wiping action.

Preferably, the method includes, after wiping said first filtering surface:
pushing said wiper back into said frame;
rotating said filter assembly; and
closing said first door.

In order to restart operation of the dryer, the filter assembly is preferably re-assembled. The wiper, which may have been removed from the frame in order to empty the full collector, is reinserted in the frame, and pushed back in the resting position, the filter assembly is rotated back so that it is located within the inner volume of the plinth and then the first door is closed, so that another drying cycle may start.

BRIEF DESCRIPTION OF THE DRAWINGS

Further advantages of the present invention will be better understood with non-limiting reference to the appended drawings, where:

FIG. 1 is a perspective view of a laundry dryer realized according to the present invention;

FIG. 2 is a perspective view of a laundry dryer of FIG. 1 with an open door to show an additional door;

FIG. 3 is a perspective view of the dryer of FIG. 1 and FIG. 2 where the additional door has been opened and the filter assembly is shown;

FIG. 4 represents the same perspective view of FIG. 3 with the filter assembly during a wiping action;

FIG. 5 represents the same perspective view of FIGS. 3 and 4, with the filter assembly at the end of a wiping action;

FIG. 6 is a perspective view of a first embodiment of the filter assembly used in the dryer of FIGS. 1-5 in a first configuration;

FIG. 7 is a perspective view of the first embodiment of the filter assembly used in the dryer of FIGS. 1-5 in a further configuration;

FIG. 8 is a perspective exploded view of the first embodiment of the filter assembly used in the dryer of FIGS. 1-5 in an even further configuration;

FIG. 9 is a perspective view of a second embodiment of the filter assembly used in the dryer of FIGS. 1-5 in a first configuration;

FIG. 10 is a perspective view of the second embodiment of the filter assembly used in the dryer of FIGS. 1-5 in a further configuration;

FIG. 11 is a perspective exploded view of the second embodiment of the filter assembly used in the dryer of FIGS. 1-5 in an even further configuration;

FIG. 12 is a perspective view of a third embodiment of the filter assembly used in the dryer of FIGS. 1-5 in a first configuration;

FIG. 13 is a perspective view of the third embodiment of the filter assembly used in the dryer of FIGS. 1-5 in a further configuration;

FIG. 14 is a perspective exploded view of the third embodiment of the filter assembly used in the dryer of FIGS. 1-5 in an even further configuration;

FIG. 15 is a schematic view of an air process duct in the dryer of FIGS. 1-5;

FIG. 16 is a perspective view of a further embodiment of a laundry dryer realized according to the present invention with the filter assembly in a first operative position;

FIG. 17 is a perspective view of a laundry dryer of FIG. 16 with the filter assembly in a further operative position;

DETAILED DESCRIPTION OF EXEMPLARY EMBODIMENTS

Figure 19:
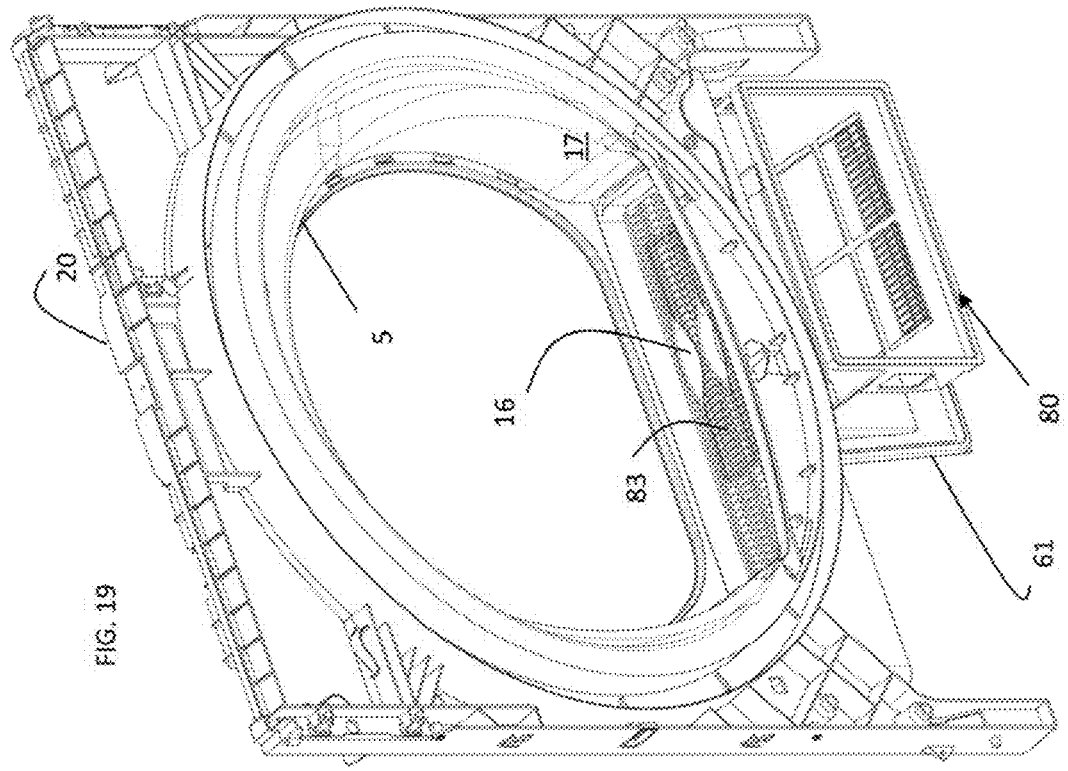
FIG. 19 is a perspective view of a detail of the laundry dryer of FIG. 16.

With initial reference to FIG. 1, a laundry dryer realized according to the present invention is globally indicated with 1.

Laundry dryer 1 comprises an outer box cabinet 2, preferably but not necessarily parallelepiped-shaped, and a drying chamber, such as a drum 3 (visible only in FIGS. 15-17), for example having the shape of a hollow cylinder, for housing the laundry and in general the clothes and garments to be dried. The drum 3 is preferably rotatably fixed to the cabinet 2. Access to the drum 3 is achieved for example via a door 4, further referred also as the loading/unloading door, preferably hinged to cabinet 2, which can open and close a loading/unloading aperture 5 realized on the cabinet itself.

More in detail, cabinet 2 generally includes a front wall 20, a rear wall 21 and two sidewalls 25, all mounted on a basement 24. Preferably, the basement 24 is realized in plastic material. Preferably, basement 24 is molded via an injection molding process. Preferably, on the front wall 20, the door 4 is hinged so as to access the drum. The cabinet, with its walls, defines the volume of the laundry dryer 1. The basement 24 rests on a floor and its vertical distance from the floor may be advantageously adjusted through regulating feet (not shown) provided on the lower surface of the basement facing the floor. The dryer 1, and in particular basement 24, defines an horizontal plane (X,Y) which is substantially the plane of the ground on which the dryer 1 is situated, thus it is considered to be substantially horizontal, and a vertical direction Z perpendicular to the plane (X,Y).

Laundry dryer 1 also preferably comprises an electrical motor assembly (not shown) for rotating, on command, revolving drum 3 along its axis inside cabinet 2.

The basement 24 defines a plinth region 7 of the dryer 1. The plinth region 7 defines a plinth inner volume, that is, the volume inside the cabinet 2 delimited by the cabinet walls and located at the plinth region 7. Preferably the plinth region 7 includes a perforated portion, for example it may include a perforated element 71 on the front wall 20, so as to enable cooling air to be taken in and/or expelled from/to the plinth inner volume, if needed. The plinth region 7 can be provided with portions and/or elements and/or components for supporting operational components of the laundry dryer 1 that are needed for carrying on a laundry drying process on laundry, such as air conduits, motors and so on.

In the drum 3 of the laundry dryer 1, the load, e.g. clothes or other laundry, to be dried is placed via the door 4 provided on the front wall 20 of the cabinet. The drum preferably includes a mantle defining a front end 3a which is facing the front wall 20 of the casing and a rear end 3b facing the rear wall 21 of the casing (visible only in FIG. 15).

Preferably, the cabinet 2 includes a plinth door 60, such as a rotatable door, to access the plinth inner volume. Preferably, the plinth door 60 is hinged to the cabinet 2 and its rotation axis is substantially horizontal. The plinth door 60 is preferably hinged at the front door 20 of the cabinet 2.

Upon opening the plinth door 60, a further door 61—called first door 61—is present. This first door 61 is accessible only opening the plinth door 60. Preferably this further door 61 is also rotatable along an axis which is substantially horizontal. The first door 61 is situated behind the plinth door 60, such that the plinth region 7 is accessible by opening both doors. Further, plinth door 60 and first door 61 are located substantially below the loading/unloading aperture 5 and door 4.

With now reference to the schematic view of FIG. 15, the drum 3 is fluidly connected to a duct defining a process air circuit 18 (depicted with a series of arrows in FIG. 15). The process air circuit 18 involves the circulation—first—of relatively dry and warm process air, inside the drum 3, on the laundry located therein so as do dry it and—second—of humid cooler process air, outside the drum 3. New dry and warm process air enters the drum 3 and the circuit is repeated until desired, preferably until the laundry is dried. When the humid process air exits the drum 3, it may be channeled in different ways, depending on the dryer type.

If the dryer 1 is a condensed dryer, the circuit 18 of the process air is a closed-loop circuit and the humid process air leaving the drum 3 is first dried by passing through a humidity removal element and/or a hot air generator, such as a heat exchanger 19. The resulting cool dry air is then heated up by means of the hot air generator 19 before re-entering again the drum 3. Preferably, the hot air generator is a heat pump and the humid air is first passing through an evaporator where the water contained in it is removed and then it is heated in a condenser before returning into the drum 3.

If the dryer 1 is a vented dryer, the circuit of the process air is open, i.e. ambient air is taken into the drier, heated up and entered into the drum 3 while the humid process air leaving the drum 3 is exhausted outside the dryer 1. This open circuit is not depicted in the drawings.

Preferably, the hot or drying air generator (e.g. heat pump 19) is located in a basement 24 of the cabinet.

Figure 18:
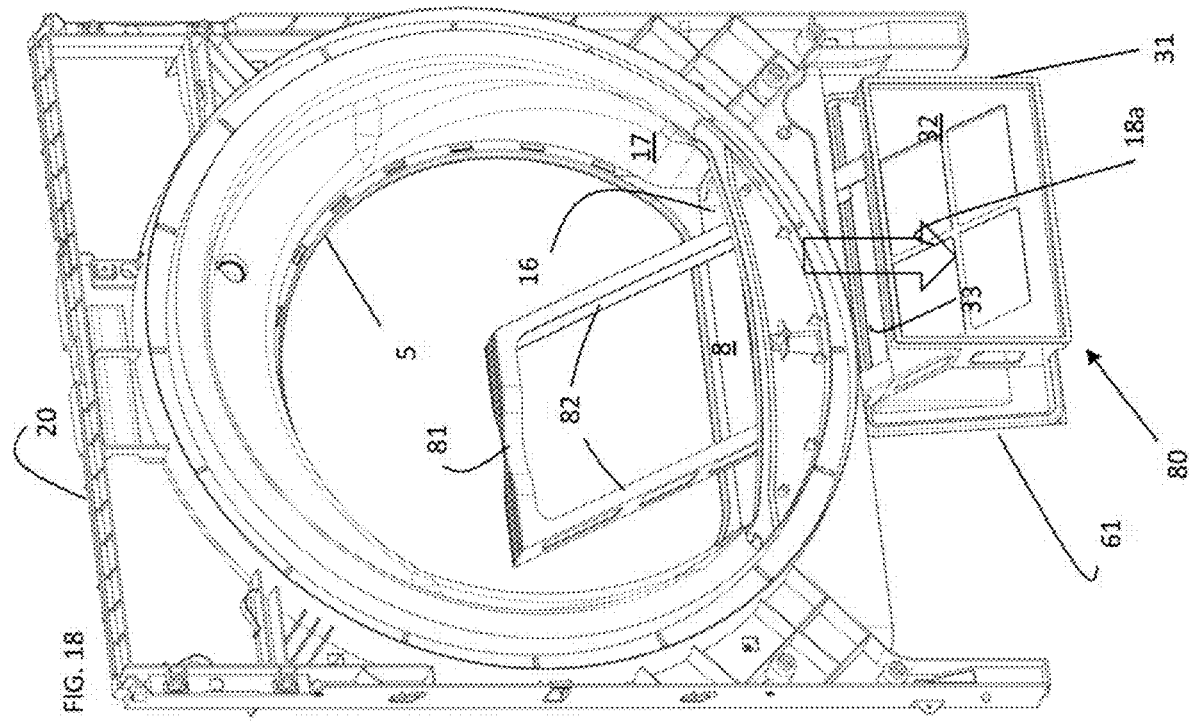
FIG. 18 is a perspective view of a detail of the laundry dryer of FIG. 17.

The duct forming the process air circuit 18 includes a first portion 18a having an inlet 16 connected with the front end 3a of the drum. This first portion 18a receives the air coming from the drum 3. The inlet 16 of the first portion 18a of the duct is located preferably at a surface 17 contouring a rim of loading/unloading aperture 5, as visible in FIGS. 16-19. Further, preferably, this first portion 18a of the duct is substantially vertical, that is, the process air flowing within the first portion 18a has the longest component of motion along a vertical axis. The process air coming from the drum 3 thus, flowing substantially horizontally, or having a motion with a longest horizontal component, needs to turn by substantially 90° at the loading/unloading aperture 5 so that it can flow within the first portion 18a of the duct via inlet 16. This situation is schematically depicted in FIG. 15.

Further, the first portion 18a of the duct extends from the inlet 16 into the plinth region 7. The duct then preferably continues with a second portion 18b which extends in the basement 24 and runs substantially horizontally, or with a longer horizontal component, so that the process air, at the end of the first portion 18a, performs a further 90° bend to continue its flow.

The process air then either preferably passes through the rear end 3b into the interior side of the drum 3, so the circuit 18 is a closed loop circuit as depicted. There, the air absorbs moisture or humidity from the laundry and, thus, dries the laundry. Alternatively, the process air is directed outside the dryer 1 via a vent (not visible in the attached drawings).

The dryer 1 is adapted to provide circulation of air, preferably with variable temperature. The process air flow is preferably generated in a region below the basement, e.g. in the duct of the process air circuit 18, for example by means of a fan (not depicted in the drawings).

In all embodiments of dryers 1, the duct defining the process air circuit 18 is also provided with a filter assembly 30, preferably situated in proximity of or at the front wall 20 of the cabinet 2 and inside the plinth region 7, with the purpose of stopping the fluff and/or lint particles detached from the laundry during the drying process to reach undesired locations and flowing with the process air. For example, in a vented dryer, the filter assembly 30 is situated upstream the vent such that the fluff and/or lint is stopped from reaching outside the dryer together with the humid process air leaving the drum 3 and being exhausted outside. In a condensed dryer, the filter assembly 30 is situated upstream the hot or drying generator 19 for stopping the fluff and/or lint from reaching and clogging up said generator.

The duct 18 thus guides the process air leaving the drum 3 towards the filter assembly 30. The filter assembly 30 is preferably arranged in such a way that the process air passes there through, reaches the end of the first portion 18a of the duct and flows within the second portion 18b, and advantageously reaches the region below the basement, where it is again sucked in by the fan.

In the example illustrated in the enclosed drawings of FIGS. 1-8, the filter assembly 30 is advantageously arranged below the drum 3. Preferably, the filter assembly 30 is contained for its majority within the plinth region 7. Further, the filter assembly 30 is arranged within the first portion 18a of the duct of the process air circuit 18, for example below the inlet 16 of the duct itself. The filter assembly 30 according to one embodiment of the invention is depicted in enlarged view in FIGS. 6-8 and includes a first filtering surface 32, in the present embodiment substantially flat, supported by a frame 31. Preferably, the filtering surface 32 is substantially vertical. The frame 31 is in this embodiment a box-like container which forms a part of the first portion 18a of the duct and the first filtering surface 32 is a side or wall of the box-like container. The box-like container 31 includes an inlet 41 for the process air, positioned on top of the frame, and surrounding walls which prevent the process air to leave the container with the exception of the wall having the first filtering surface 32. The filtering surface 32 is preferably substantially perpendicular to the inlet 41 of the box-like container. The process air therefore, entering the inlet 41 from above, is forced to perform a 90° turn to change direction from a downwards direction to a substantially horizontal direction and is apt to leave the box-like container via the filtering surface 32. The first filtering surface 32 separates the first portion 18a of the duct 18 and the second portion 18b of the duct, that is, the first filtering surface 32 puts in fluid communication the first portion 18a and second portion 18b of the duct 18.

Preferably, the inlet 41 is located at the top of the frame 31. A bottom part 42 is also defined, opposite to inlet 41. The bottom part 42 is not used as an outlet, on the contrary, the outlet from the filter assembly 30 is via the first filtering surface 32, as better detailed below.

The first filtering surface 32 may be in the form of a mesh or net having a proper size to block the typical fluff or particles generated by the laundry. The mesh or filter is not depicted in the drawing otherwise it would cover all other elements. Therefore, in the drawings, first filtering surface 32 appears "open", but it should be interpreted as covered by a net or mesh, or any other structure apt to filter material flowing in the process air flowing in duct 18.

Preferably, the filtering surface 32 is positioned substantially vertically, or with a small tilt with respect to the vertical direction. The frame 31 thus defines an upper portion, which is the portion of the frame having the top most vertical position (i.e. the portion including the inlet 41).

In the filter 30 of FIGS. 5-8 a single filtering surface 32 is present.

The frame 31 may also comprise a non-filtering surface 37 facing the first filtering surface 32. In this configuration, the frame 31 is defining an inner volume 40 between the first filtering surface 32 and the non-filtering surface 37, but one surface only, the filtering one, is subjected to the flow of process air in order to filter it. The non-filtering surface 37, in other words, in this embodiment, is a wall of the box-like container or frame 31 which is opposite and facing the first filtering surface 32 (which forms another wall of the box like container 31) and directs the flow of process air.

In this embodiment, the non-filtering surface 37 is attached to the first door 61. By opening this further first door 61, the filter assembly 30 can be, for example, rotated from a position where the first filtering surface is substantially vertical to a position where the first filtering surface is tilted with respect to a vertical plane. Further, rotation of the first door 61 causes rotation of the whole filtering assembly 30 which is attached to the door 61.

In this embodiment, therefore, the filtering surface 32 is substantially facing and even more preferably parallel to the first door 61 to which the non-filtering surface 37 is attached. Both first door 61 and filtering surface 32 are preferably vertical, that is, they define substantially vertical planes or planes only slightly tilted with respect to a vertical plane. Between the two surfaces, i.e. non filtering surface 37 and filtering surface 32, the inner volume 40 is defined.

In a non-depicted embodiment, the first door 61 is not attached to the non-filtering surface 37. The filter assembly 30 may still be rotatable, for example with a rotation axis also parallel to the horizontal axis around which the plinth door 60 and the first door 61 rotates, however the rotations of the doors 60, 61 and of the filter assembly 30 are independent. Therefore, in order to move into a position in which the first filtering surface is tilted with respect to a vertical plane, in this non depicted embodiment the first door 61 is first rotated and then the filter assembly is rotated as well.

In all embodiments, rotation of the filter assembly, attached or not to the first door 61, implies that the filter assembly reaches a tilted position where the inlet 41 of the frame is directed outwards, that is, the inlet 41 is facing the exterior of the cabinet 2.

In different embodiments, the filter assembly, as depicted in FIGS. 9-11 and 12-14, respectively indicated as 30' and 30", includes a substantially wedge-shaped filtering cartridge, which is the frame of the filter assembly, which can be either attached to the first door 61 or which can be freely rotatable around an horizontal axis independently from the rotation of the plinth door 60 and door 61, as described above. Both filter assemblies 30' and 30" include more than a single filtering surface.

The frame of the filter assembly 30' comprises a shell or cartridge 112. The shell 112 includes a first part 116 and a second part 118. The first part 116 and the second part 118 of the shell 112 are hinged to each other. For example, the two parts are connected via hinge 124.

The first part 116 and the second part 118 are both defining filtering surfaces. Preferably, the first and second parts are covered or coverable by a filtering net so as to form filtering surfaces. The filtering nets are not explicitly shown in FIGS. 9-11. Each of the filtering nets extends within one plane.

For example, shell 112 includes two filtering surfaces, one per part. For example, the filtering surface may be formed by a perforated grid. One portion of the perforated grid may be an integrated part of the first part 116, forming a first filtering surface, while the other portion of the perforated grid may be an integrated part of the second part 118 forming a second filtering surface. The portions of the perforated grid are arranged at the first and second outer parts 116 and 118, respectively, opposite to the outer hinge 124. In a closed state of the filter assembly 30', the two filtering surfaces are substantially parallel one to the other and facing each other. The internal volume between the first and second parts 116, 118 is the inner volume 40 of the frame.

Preferably, the shell 112 is positioned so that the first and second filtering surface are substantially vertical. When the filter assembly 30' is rotated around the horizontal axis, for example due to rotation of the door 61, or independently, then the filtering surfaces become tilted with respect to the vertical direction.

In total, the filter assembly 30' includes two filtering surfaces.

The frame of the filter assembly 30" comprises an outer shell 112 and an inner shell 114. The outer shell 112 includes a first outer part 116 and a second outer part 118, as the shell of filter assembly 30'. The inner shell 114 includes a first inner part 120 and a second inner part 122. The inner shell 114 is hinged inside the outer shell 112. Further, the first outer part 116 and the second outer part 118 of the outer shell 112 are hinged to each other. In a similar way, the first inner part 120 and the second inner part 122 of the inner shell 114 are hinged to each other. Moreover, the first inner part 120 and the second inner part 122 are hinged at the first outer part 116. The outer shell 112 and the inner shell 114 are separately openable. The inner shell 114 is preferably removable from the outer shell 112. For example, the first outer part 116 and the second outer part 118 of the outer shell 112 are connected by an outer hinge 124. The first inner part 120 and the second inner part 122 of the inner shell 114 are connected by an inner hinge 126.

The filter assembly 30" is formed in a book-like manner. The first outer part 116 and the second outer part 118 of the outer shell 112 are ideally comparable with a book cover. The first inner part 120 and the second inner part 122 of the inner shell 114 are ideally comparable with book pages.

The first outer part 116, the second outer part 118, the first inner part 120 and the second inner part 122 are all defining filtering surfaces. The inner portions of said filtering surfaces are covered or coverable by a filtering net in each case. The filtering nets are not explicitly shown in FIGS. 12-14. Each of the filtering nets extends within one plane.

For example, each shell 112, 114 includes two filtering surfaces, one per part. For example, the filtering surface may be formed by a perforated grid. One portion of the perforated grid may be an integrated part of the first outer part 116, forming a filtering surface, while the other portion of the perforated grid may be an integrated part of the second outer part 118 forming another filtering surface. The portions of the perforated grid are arranged at the first and second outer parts 116 and 118, respectively, opposite to the outer hinge 124. In a closed state of the filter assembly 30", the two filtering surfaces are substantially parallel one to the other and facing each other.

In the same manner, a perforated grid may cover the inner shell 114, in particular preferably a first portion covers the first inner part 120 and a second portion covers the second inner part 122 forming other two filtering surfaces (not depicted). When the first inner part and the second inner part are closed, the two filtering surfaces substantially face each other and are parallel to each other. The internal volume between the first and second inner part 120, 122 when the shell is closed is the inner volume 40 of the frame.

Preferably, the inner and outer shells 112, 114 are positioned so that the filtering surfaces are substantially vertical. When the filter assembly 30" is rotated around the horizontal axis, for example due to rotation of the door 61, or independently, then the filtering surfaces become tilted with respect to the vertical direction.

In total therefore the filter assembly 30" includes four filtering surfaces.

Further, the filter assembly, in any depicted embodiment 30, 30', 30", includes a cleaning device 33 apt to clean the first filtering surface 32 (the first filtering surface in assembly 30' is the surface of the shell 112 not attached to door 61, in the assembly 30" any of the two surfaces of inner shell 114) of fluff or other materials deposited on it. The cleaning device 33 comprises a wiper 330 to wipe the first filtering surface 32 and also preferably a manually operable handle 332 connected to said wiper 330 in order to move it from a first to a second position.

Preferably the handle 332 is integral to the wiper 330. Preferably, both wiper 330 and handle 332 are made of plastic material.

The movements performed by the wiper 330 onto the first filtering surface 32 of frame 31 are sliding movement, that is, the wiper 330 translates onto the first filtering surface 32 in order to remove fluff or other filtered material from it.

Further, the wiper 330 has a shape matching the shape of the inner volume 40 created by the frame 31. Therefore, depending on the shape of the frame 31, the shape of the wiper 330 follows accordingly.

In all embodiments, the wiper 330 includes a fluff collector 50. The fluff collector 50 is a portion of wiper and, in an embodiment where the filtering surface 32 is substantially vertical or it has a major vertical component, it includes a bottom wall 51 of the wiper 330. Further, the wiper may include lateral walls 52 contouring the bottom part or wall 51 of the wiper 330. The lateral wall 52 may be, at least partially, part of the fluff collector 50. Thus wiper 330 includes the fluff collector 50 at its bottom end and the fluff collector is apt to collect the fluff or lint or any other filtered material collected when the wiper 330 slides onto the first filtering surface 32 and which fall into the fluff collector 50 by gravity.

The wiper 330 is housed in the inner volume 40. In the embodiment of FIGS. 1-8, the frame 31, having the shape of a box-like container, defines a box-like inner volume 40. Thus, as shown, the wiper 330 has also a box-like shape.

The box like shape is formed by a plurality of crosspieces, which for example form the sides of a substantially parallelepiped shaped form. The wiper 330 is thus formed by these crosspieces which create a shape which mates the shape of the inner volume 40 of the frame 31. One of the crosspieces, indicated with 331, is in contact with the first surface 32 and thus translation of the wiper 330 in turns means translation of the crosspiece 331 onto the first surface 32 and thus scraping of the same.

The wiper 330 thus fills up the volume 40 from the inlet 41 of the frame 31 till the bottom 42 of the frame 31. The wiper 330, in a position corresponding to the inlet 41 of the frame, where preferably the handle 332 is located, in also preferably air permeable, that is, preferably the process air can pass through it. For example, a top portion of the wiper 330 located at the inlet 41 includes the handle 332 and two openings 333 at the two opposite side of the handle 332, so that process air can freely flow into the wiper 330. Handle 332 and openings 333 forms a plane perpendicular to the direction of flow of the process air in the inlet 41.

The fluff collector 50 has substantially a flat bottom defined by the bottom wall 51 of the wiper 330.

The filter assembly 30' includes also a wiper 330, the shape of which is determined by the inner volume 40 of shell 112 and given by the shape of the two operable parts 116, 118. For example, as depicted in FIGS. 9-11, the wiper 330 has a rectangular O shape, including four bars forming an O. The bar forming the lower portion of the O, bar 331', scrapes onto the first filtering surface 32 when the wiper 330 is moved. In the case of the filter assembly 30', the sliding of the bar 331' causes the wiping of two filtering surfaces located at the two opposite parts 116, 118. The wiper 330 has a rounded bottom part 51' defining the fluff collector 50.

The filter assembly 30" includes a wiper 330, the shape of which is defined by the shape of the inner volume 40 defined by the inner shell 114. The wiper 330 has a rectangular O shape, with substantially four bars forming an O and the lower bar 331" scraping onto the first filtering surface. The filtering surfaces are those formed in the first and second inner part 120, 122 of the inner shell 114. The wiper 330 has a flat bottom part 51" defining the fluff collector 50.

The operation of the filter assembly 30, 30', 30" as follows.

During the drying cycle, or outside a wiping action, the wiper 330 is positioned inside the frame 31, inserted in the same. The whole assembly is located within the plinth inner volume and it forms a portion of the conduit 18. The first filtering surface filters the flowing process air in circuit 18 and filtered material accumulates on it. The first filtering surface 32 is preferably substantially vertical of with a large vertical component. The wiper 330 is completely inserted within the frame 31 and the fluff collector 50 is located at the bottom of the frame 31. Preferably, the wiper 330 does not extend outside the frame 31 but it is completely contained therein. This position is called resting position of the wiper.

In this configuration inlet 16 of the conduit 18 and inlet 41 of the filter assembly 30, 30', 30" are one below the other, being part of the same conduit.

At the end of a drying cycle, or every time there is a need of cleaning the first filtering surface 32 of the filter assembly from the filtered material which has accumulated during the drying cycle, the plinth door 60 is opened. The opening takes place preferably with a rotation of the plinth door 60 around a horizontal axis. This configuration is shown in FIG. 2. Behind the plinth door 60, the first door 61 is present. Attached to the first door, the filter assembly is located. Alternatively, the filter assembly is freely rotatable around an horizontal axis.

Opening the first door 61, that is, preferably rotating the same around an horizontal axis, removes the assembly 30, 30', 30" from the inner volume of the plinth and the inlet 41 of the frame 31 is oriented outwards.

The wiper located within the frame is in the resting operative position, as shown in FIG. 3, totally inserted in the frame 31.

In order to wipe the first filtering surface 32, the manually operable handle 332 can be grip, for example by a user or by a suitable tool, and pulled in an upwards movement. Pulling the handle 332 causes a sliding of the wiper 330, and in particular of bar or crosspiece 331, 331", 331" on the first filtering surface 32. This is shown in FIG. 4. The end of the movement is reached, when the fluff container 50 is substantially at the upper portion of the frame 31, at the inlet 41. This position is the end position of the wiping movement or action.

In addition, the wiper 330 can be removed from the frame 31, as shown in FIG. 5, in order to remove the fluff contained in the fluff container 50 and empty the same.

In an enlarged view, the resting position of assembly 30 is shown in FIG. 6, of assembly 30' in FIG. 9 (although in this figure the wiping action has already started), and of assembly 30" in FIG. 12. This operative position is the "most compact" position of the filter assembly 30, 30', 30" where the wiper 330, 330', 330" is completely contained inside the frame 31 and does not protrude from it. The fluff collector 50 is located at the bottom 42 of the frame 32 and it is preferably even in contact with the bottom 42 of the frame itself.

The end position of the filter assembly 30, 30', 30" is the position where the wiper 330 is translated till the upper portion of the frame and the bar or crosspiece 331, 331', 331" of the wiper 330 has travelled through the whole first filtering surface 32 in the sliding wiping movement. The fluff collector 50 therefore has collected all the filtered material present in the first filtering surface. This configuration is depicted in FIG. 7 for the filter assembly 30 and in FIG. 10 for the filter assembly 30'. FIG. 13 shows filter assembly 30" between the resting and the end positions.

The wiper 330 can be then extracted from the frame 31. In case of filter assembly 30, this simply require a further pull of the wiper 330, for example by means of the handle 332. In case of filter assemblies 30', 30", this requires also the opening of the shell 112 or 112 and 114 forming the frame 31 of the filter assembly, as shown in FIGS. 11 and 14.

Before the dryer 1 can restart operation, the wiper 330 needs to be reinserted in the frame 31 (in case it has been removed), the door 61 rotated again so that the filtering surface 32 is back to a vertical position, as well as the door 60 should close the plinth region 7.

A different embodiment of a filter assembly 80 is now shown with reference to FIGS. 16-19. Characteristics identical to the previous embodiments will be referred to with the same reference numerals.

The filter assembly 80, in addition to the characteristics disclosed in the previous embodiments, includes an actuator 81 and a connector 82. Actuator 81, in the preferred depicted embodiment having the same shape as handle 332, is connected to the connector 82 which is in turn connected to the wiper 330.

More in detail, the dryer 1 includes, at the aperture 5 for the loading and unloading, the surface 17 where a seat 8 is formed. The seat 8 is located at the inlet 16 of duct 18, that is, the seat is substantially formed around inlet 16.

The actuator 81 is positioned within the seat 8 and preferably does not protrude from the latter. The actuator, as mentioned, includes preferably an handle formed in plastic material and it extends downwards towards the plinth within the seat 8 by means of the connector 82. The connector transforms movement of the actuator 81 into movement of the wiper 330. The connector 32 in the preferred embodiment includes two parallel bars 82. The two parallel bars represent the geometrical continuation of two sides of the wiper 330. The two sides are preferably the sides substantially perpendicular to the first door 61 and/or the first filtering surface 32.

Preferably, connector 82 and wiper 330 are an integral piece.

Preferably the actuator 81, besides the presence of a handle shaped portion, is air permeable, being located at the inlet 16 of the duct 18. For this purpose preferably it includes a plurality of perforations 83, for example formed in a surface perpendicular to the first filtering surface.

The operation of the filter assembly 80 is as follows.

In the resting configuration, the actuator is positioned in the seat 8 and does not protrude from the same. The wiper 330 has the fluff collector 50 located at the bottom of frame 31. In this configuration door 61 cannot be opened. The filtering surface 32 is substantially vertical.

The loading/unloading door 4 is opened, for example to download laundry from the drum 3. At the end of the download, the user may actuate the actuator 81, by pulling it upwards, so that it protrudes from the seat 8. By pulling it upwards, the connector 82 attached to the wiper 330 slides the wiper in the frame 31 so that the bar 331 scrapes the first filtering surface. The fluff is collected in the fluff collector 50. The end position of the wiper is reached.

In order to remove the fluff collected in the fluff collector 50, the wiper 330 may be totally extracted from the seat 8. In this configuration, the door 61 can be opened and the filter assembly 30 rotated. The opening of the first door 61 can take place for example for cleaning the remaining of the filter assembly in case some filtered material has fallen from the fluff container 50 or for other maintenance purposes.

Further, before starting a new drying cycle, the wiper 330 needs to be reinserted in the frame 31. In this way the resting position in reached again, where the fluff container 50 is positioned at the bottom of the frame 31.

The above configuration in which the wiper 330 is actuated by means of an actuator via a connector can be realized also using the assemblies 30' and 30". These assemblies can be for example attached to the first door 61, by means of the part of the shell 112, such as first part 116.

The invention claimed is:

1. A laundry dryer comprising:
   a cabinet including a plinth portion defining an inner plinth volume internal to the cabinet;
   a first door arranged in the plinth portion of the cabinet;
   a drum rotatably supported in the cabinet;
   a duct defining a flow passage for process air exiting the drum;
   a filter assembly positioned in a duct section located in the inner plinth volume so as to filter process air flowing therein, the filter assembly being at least partly located behind the first door and including:
      a frame defining an inner frame volume and having a frame shape;
      a filter supported by the frame and defining a first filtering surface;
      a cleaning device having a slidable wiper having a wiper shape mating the frame shape of the inner frame volume and a fluff collector, and a handle configured to move the cleaning device relative to the frame, the cleaning device being positionable within the inner frame volume and translatable with respect to the frame to cause the slidable wiper to wipe the first filtering surface and to collect filtered material removed from the first filtering surface in the fluff collector.

2. The laundry dryer according to claim 1, wherein the cabinet includes a loading/unloading aperture located above the plinth portion to allow access to the drum and a loading/unloading door to close the loading/unloading aperture, and the first door is a plinth door giving access to the plinth portion of the cabinet or a door accessible by opening the plinth door.

3. The laundry dryer according to claim 1, wherein the first door is a rotatable about a first door axis.

4. The laundry dryer according to claim 3, wherein the filter assembly is rotatably mounted about a filter assembly axis.

5. The laundry dryer according to claim 4, wherein the filter assembly axis is parallel to the first door axis.

6. The laundry dryer according to claim 5, wherein the filter assembly axis is coincident with the first door axis.

7. The laundry dryer according to claim 1, wherein the frame comprises a non-filtering surface facing the first filtering surface, and the non-filtering surface is attached to the first door.

8. The laundry dryer according to claim 1, wherein the filter assembly defines a portion of the flow passage for the process air.

9. The laundry dryer according to claim 1, wherein the frame is box-like shaped and the slidable wiper has a mating box-like shape.

10. The laundry dryer according to claim 1, wherein the fluff collector is located between the first filtering surface and the first door.

11. The laundry dryer according to claim 1, wherein the fluff collector is integral to the slidable wiper.

12. The laundry dryer according to claim 1, wherein the wiper includes one or more ribs or an edge configured to scrape the first filtering surface.

13. The laundry dryer according to claim 1, wherein the cleaning device is movable in a wiping direction between a resting position in which the slidable wiper and fluff collector are located at a bottom of the frame, and an end position in which the fluff collector is located at an upper part of the frame.

14. The laundry dryer according to claim 13, wherein the fluff collector, in the end position, is located within the frame.

15. The laundry dryer according to claim 1, further comprising:
   an actuator configured to translate the cleaning device relative to the frame, the actuator being remote from the filter assembly and comprising the handle; and
   a connector operably connecting the actuator to the cleaning device such that movements of the actuator are transformed in translating movement of the wiper.

16. The laundry dryer according to claim 15, wherein the cabinet includes a loading/unloading aperture to allow access to the drum and a loading/unloading door to close the loading/unloading aperture, an inlet of the duct being formed on a rim surface of the loading/unloading aperture, and wherein the actuator is located at the inlet.

17. A method to clean a filter assembly in a laundry dryer, wherein the laundry dryer comprises:
- a cabinet including a plinth portion defining an inner plinth volume internal to the cabinet;
- a first door arranged in the plinth portion of the cabinet;
- a drum rotatably supported in the cabinet;
- a duct defining a flow passage for process air exiting the drum;
- a filter assembly positioned in a duct section located in the inner plinth volume so as to filter process air flowing therein, the filter assembly being at least partly located behind the first door;
- said filter assembly including:
  - a frame defining an inner frame volume and having a frame shape;
  - a filter supported by the frame and defining a first filtering surface;
  - a cleaning device positioned within the inner frame volume for cleaning the first filtering surface including a wiper having a shape mating the frame shape of the inner frame volume;
- the method including:
  - opening the first door in order to access the wiper;
  - sliding the wiper by pulling or pushing a manually operable handle, so as to wipe the first filtering surface;
  - collecting, while sliding, filtered material present in the first filtering surface in a fluff collector of the wiper.

18. The method according to claim 17, further comprising removing the wiper from the frame to dispose the filtered material.

19. The method according to claim 17, wherein sliding the wiper includes pulling the wiper up from a first position where the wiper is fully inserted in the inner volume of the frame, to a second position wherein the wiper is at least partially protruding from the frame.

20. The method according to claim 17, further comprising, after collecting the filtered material, pushing the wiper downwards so as to insert the wiper back in the inner volume.

21. The method according to claim 17, wherein opening the first door comprises rotating the first door around a horizontal axis.

22. The method according to claim 17, further comprising rotating the filter assembly around a filter assembly axis.

23. The method according to claim 22, further comprising, after rotating the filter assembly around the filter assembly axis, sliding the wiper to extract the wiper from the frame.

24. The method according to claim 23, further comprising, after sliding the wiper to extract the wiper from the frame:
- pushing the wiper back into the frame;
- rotating the filter assembly; and
- closing the first door.

* * * * *